United States Patent [19]
Weber et al.

[11] 3,819,865
[45] June 25, 1974

[54] ASSIGNMENT AND CONNECTION OF CALL DIGIT RECEIVERS AND SENDERS TO A REGISTER IN A COMMUNICATION SWITCHING SYSTEM

[75] Inventors: Fred A. Weber, Glen Ellyn; James P. Caputo, Chicago; John W. Eddy, Villa Park; Phil R. Harrington, Mt. Prospect; Gerald O'Toole, Elmhurst; Sergio E. Puccini, Wood Dale; Diane L. Adamski, Melrose Park, all of Ill.

[73] Assignee: GTE Automatic Electric Laboratories Incorporated, Northlake, Ill.

[22] Filed: May 9, 1973

[21] Appl. No.: 358,753

[52] U.S. Cl. .......... 179/15 AT, 179/18 ES, 179/18 J
[51] Int. Cl. .......... H04j 3/12
[58] Field of Search .......... 179/15 BY, 15 A, 15 AT, 179/15 AQ, 18 ES, 18 J

[56] References Cited

UNITED STATES PATENTS

| | | | |
|---|---|---|---|
| 3,458,659 | 7/1969 | Sternung | 179/18 J |
| 3,524,946 | 8/1970 | Pinet | 179/18 J |
| 3,646,277 | 2/1972 | Gueldenpfennig | 179/18 J |
| 3,705,267 | 12/1972 | Marino | 179/15 AQ |
| 3,760,364 | 9/1973 | Yamauchi | 179/18 ES |
| 3,761,894 | 9/1973 | Pilc | 179/15 AQ |
| 3,768,079 | 10/1973 | Bittermann | 179/18 ES |

*Primary Examiner*—Ralph D. Blakeslee
*Attorney, Agent, or Firm*—B. E. Franz

[57] ABSTRACT

The common control of the switching system comprises two separate subsystems, a stored program data processing unit with a main memory, and a register subsystem with a register memory and a plurality of register junctors in a time division multiplex arrangement. Multifrequency receivers and senders and touch calling tone receivers are connected to the register junctors via a one stage matrix in the register subsystem. The main memory has assignment tables, busy/idle tables and on-line/off-line tables for the receivers and senders which are used with stored program modules to select a sender or receiver, and supply type and address information to the register memory. The register subsystem with hard wired logic operates the matrix to connect the sender or receiver to the register junctor.

17 Claims, 14 Drawing Figures

ASSIGNMENT AND CONNECTION OF CALL DIGIT RECEIVERS AND SENDERS TO A REGISTER IN A COMMUNICATION SWITCHING SYSTEM

BACKGROUND OF THE INVENTION

1. Field of the Invention

This invention relates to an arrangement for the assignment and connection of call digit receivers and senders to a register junctor, after the register junctor has previously been connected to a calling line, in a communication switching system; and more particularly to such assignment and connection in a system having a wired logic register-sender subsystem with its own memory to receive, store, and send call digits, and a separated data processing system for other common control functions.

2. Description of the Prior Art

Common control communication switching systems now have a variety of call digit signal devices for receiving and sending call digits. For example subscriber telephone sets may be equipped with either a rotary dial for direct-current dial pulse signaling; or with a push button set for a type of signaling generically known as dual tone, which comprises two frequencies for each digit, one high and one low, referred to herein as touch calling. Thus a local originated call will require either a dial pulse or a touch calling receiver, which may be determined by a class-of-service indication. Interoffice signaling generally uses either dial pulse or two-out-of-six multifrequency signaling, which requires providing dial pulse and multifrequency receivers and senders.

One known arrangement is exemplified by U.S. Pat. No. 3,570,008 by R. W. Downing et al. issued Mar. 9, 1971, in which the required receivers or senders are provided as terminations of the main switching network, with selection and connection controlled by a stored program central processor (see claim 38 thereof).

Another known arrangement provides a plurality of register junctors, one of which is selected and connected to a calling line (local line or incoming trunk) under control of a marker responsive to a call origination. A register memory has a given number of words individual to each register junctor for digit storage and control, and a time division multiplex arrangement with cyclically recurring time slots individual to the register junctors uses common logic circuits for receiving, storing, and sending of call digits. As shown in U.S. Pat. No. 3,301,963 by D. K. K. Lee et al. issued Jan. 31, 1967, each register junctor has individual provision for receiving call digits, but there are fewer senders with a register-sender matrix for connecting them to the register-junctors with wired logic control using information stored in the register-junctor memory. In the system disclosed in U.S. Pat. No. 3,328,534 by R. J. Murphy et al. issued June 27, 1967, the dial pulse receiving and sending is accomplished in the register junctors, while a connect matrix is provided for connecting touch calling receivers or multifrequency transceivers to the register junctors under wired logic control.

While the selection of receivers and senders can be accomplished effectively, it does result in additional hardware which is difficult to diagnose in the case of hardware faults and also results in an inflexible selection arrangement. Reservation of senders and receivers for testing and other maintenance functions is far more difficult when the selection is in the hardware.

SUMMARY OF INVENTION

This invention relates to a system in which the common control comprises two major subsystems, a time-division multiplex register-sender subsystem, and a stored program data processing unit. The register-sender subsystem comprises a plurality of register junctors, a register memory having blocks of storage individual to the register junctors, common logic circuits, and a timing generator supplying cyclically recurring time slot signals individual to the register junctors. Calling lines, whether local lines or incoming trunks, are connected under marker control via the switching network to register junctors. The register-sender subsystem also includes separate pools of multifrequency senders for connection to outgoing trunks, multifrequency receivers for connection to incoming trunks, and touch calling receivers for connection to local lines. There is a single stage sender-receiver matrix having register junctors on one side, and the multifrequency senders and receivers and touch calling receivers on the other side. The connection of a sender or receiver involves three major steps: (1) the selection of an idle receiver or sender, (2) the actual connection of the receiver or sender to a register junctor through the sender-receiver matrix, and (3) disconnection of the receiver or sender from the register junctor once the digits have been received or sent.

According to the invention, there is provided a combination of hardware and programmed instructions with main memory tables, wherein the selection and generation of connection instructions are under software control; and the actual connection and disconnection functions are performed by hardware in the register sender subsystem.

This combination provides the reliability of hardware to make the actual connection and the flexibility of a stored program to take all factors into consideration in selecting the right sender or receiver.

CROSS-REFERENCES TO RELATED APPLICATIONS

Figure 1:
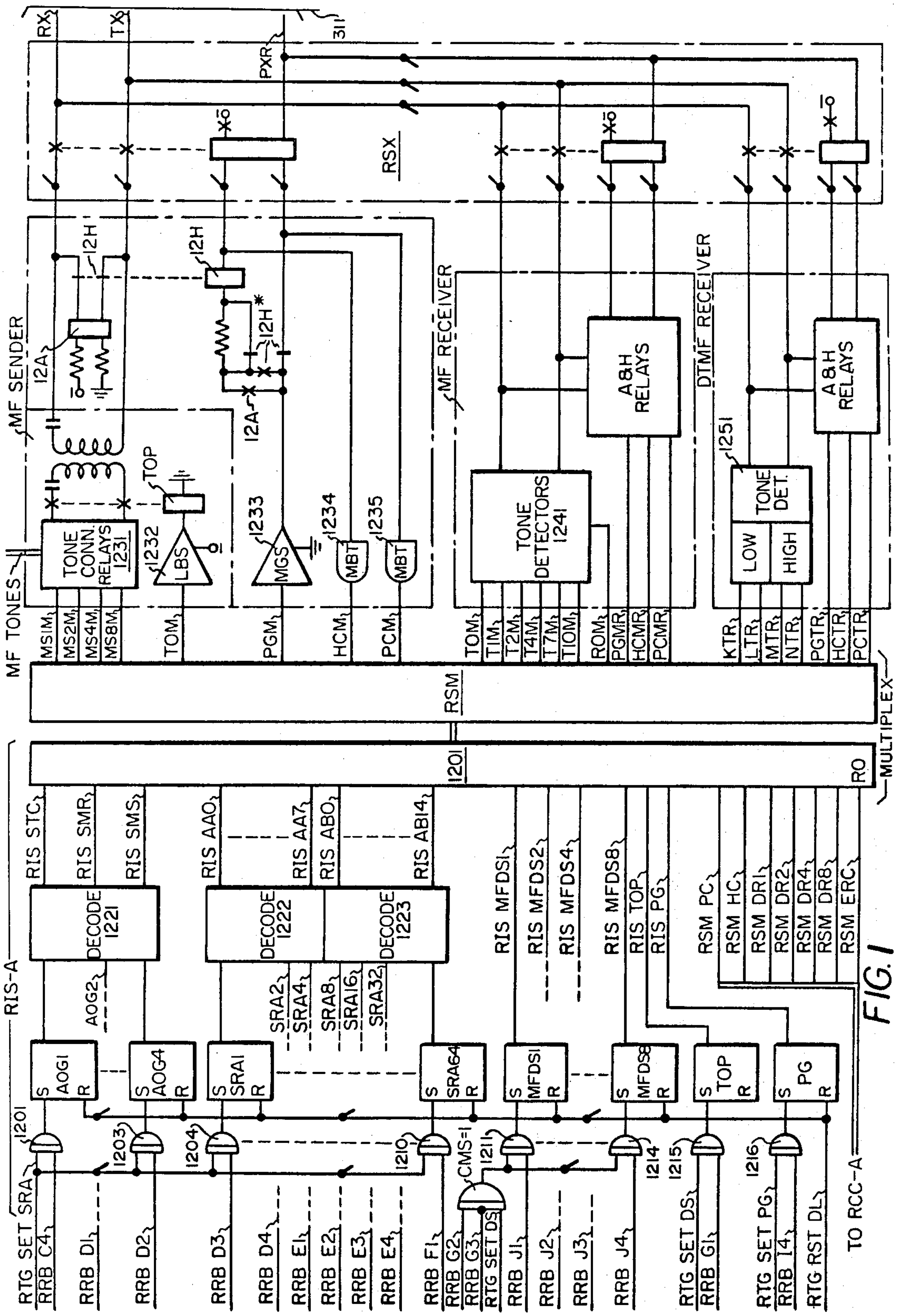
FIG. 1 is a diagram showing one of each of the types of tone senders and receivers, with interfacing matrix and multiplex circuits and some of the common logic.

The preferred embodiment of the invention is incorporated in a COMMUNICATION SWITCHING SYS- TEM WITH MARKER, REGISTER AND OTHER SUBSYSTEMS COORDINATED BY A STORED PROGRAM CENTRAL PROCESSOR, U.S. patent application Ser. No. 130,133 filed Apr. 1, 1971 by K. E. Prescher, R. E. Schauer and F. B. Sikorski, now U.S. Pat. No. 3,729,715 and a continuation-in-part thereof Ser. No. 342,323, filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,480 filed May 3, 1971 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851 filed Nov. 24, 1971 by S. E. Puccini, now U.S. Pat. No. 3,737,873, for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909 by J. P. Caputo and F. A. Weber, now U.S. Pat. No. 3,784,801 for a DATA HANDLING SYSTEM ERROR AND FAULT DETECTING AND DISCRIMINATING MAINTENANCE ARRANGEMENT, Ser. No. 270,910 by C. K. Buedel and J. P. Caputo, now U.S. Pat. No. 3,783,255, for a DATA HANDLING SYSTEM MAINTENANCE ARRANGEMENT FOR PROCESSING SYSTEM TROUBLE CONDITIONS, Ser. No. 270,912 by C. K. Buedel and J. P. Caputo, now U.S. Pat. No. 3,805,038, for a DATA HANDLING SYSTEM MAINTENANCE ARRANGEMENT FOR PROCESSING SYSTEM FAULT CONDITIONS, and Ser. No. 270,916 by J. P. Caputo and G. O'Toole, now U.S. Pat. No. 3,783,256, for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent applications Ser. No. 281,586 filed Aug. 17, 1972 by J. W. Eddy for an INTERLOCK ARRANGEMENT FOR A COMMUNICATION SWITCHING SYSTEM, Ser. No. 311,606 filed Dec. 4, 1972 by J. W. Eddy and S. E. Puccini for a COMMUNICATION SYSTEM CONTROL TRANSFER ARRANGEMENT, Ser. No. 303,157 filed Nov. 2, 1972 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. Patent application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966 filed Apr. 4, 1973 by L. V. Jones and P. A. Zelinski for a SENSE LINE PROCESSOR WITH PRIORITY INTERRUPT ARRANGEMENT FOR DATA PROCESSING SYSTEMS.

One of the program modules used in accessing the register-sender memory is disclosed in U.S. patent application Ser. No. 353,811 filed April , 1973 by S. E. Puccini, C. K. Buedel, P. R. Harrington and P. J. Keehn for a COMMUNICATION SWITCHING SYSTEM WITH REGISTER SUBSYSTEM HAVING SEQUENTIAL ACCESS TO A REGISTER MEMORY, AND A STORED PROGRAM CENTRAL PROCESSOR HAVING ACCESS TO A MAIN MEMORY AND THE REGISTER MEMORY.

The above system, register-sender, marker, communication register, executive computer line processor and register-sender access patents and applications are incorporated herein and made a part hereof as though fully set forth.

DESCRIPTION OF THE PREFERRED EMBODIMENT

FIG. 1 shows one MF sender, one MF receiver and one DTMF (touch calling) receiver, and three crosspoints of a matrix RSX for connecting them to a register junctor. Also shown is part of the common logic circuits for controlling the senders and receivers via multiplex circuits RSM.

GENERAL SYSTEM DESCRIPTION

Figure 2:
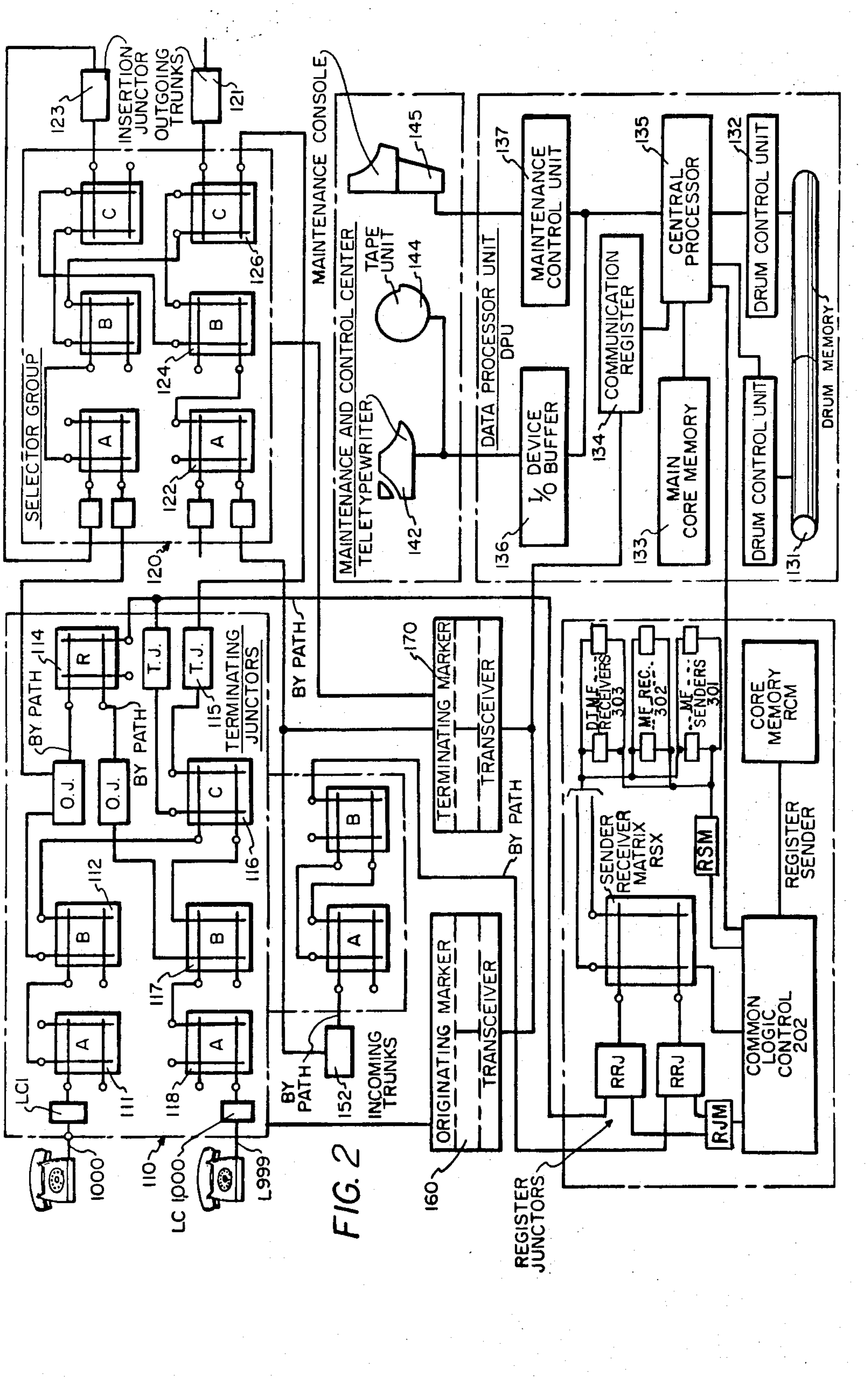
FIG. 2 is a block diagram of a communication switching system incorporating the preferred embodiment of the invention.

The telephone switching system is shown in FIG. 2. The system is disclosed in said SYSTEM patent application, and also in said REGISTER-SENDER MEMORY CONTROL patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 160 control the switching networks of the selector group 120 for establishing connections therethrough; and if a call is to be terminatated at a local customer's line in the office then the terminating marker sets up a connection through both the selector group 120 and the line group 120 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to common logic 202, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other subsystems such as the data processor unit 130 on a random access basis. Multiplex circuits RJM and RSM effectively couple the register junctors, and senders and receivers to the common logic during register junctor time slots.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of the idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

REGISTER-SENDER SUBSYSTEM

Register Junctor

Figure 3:
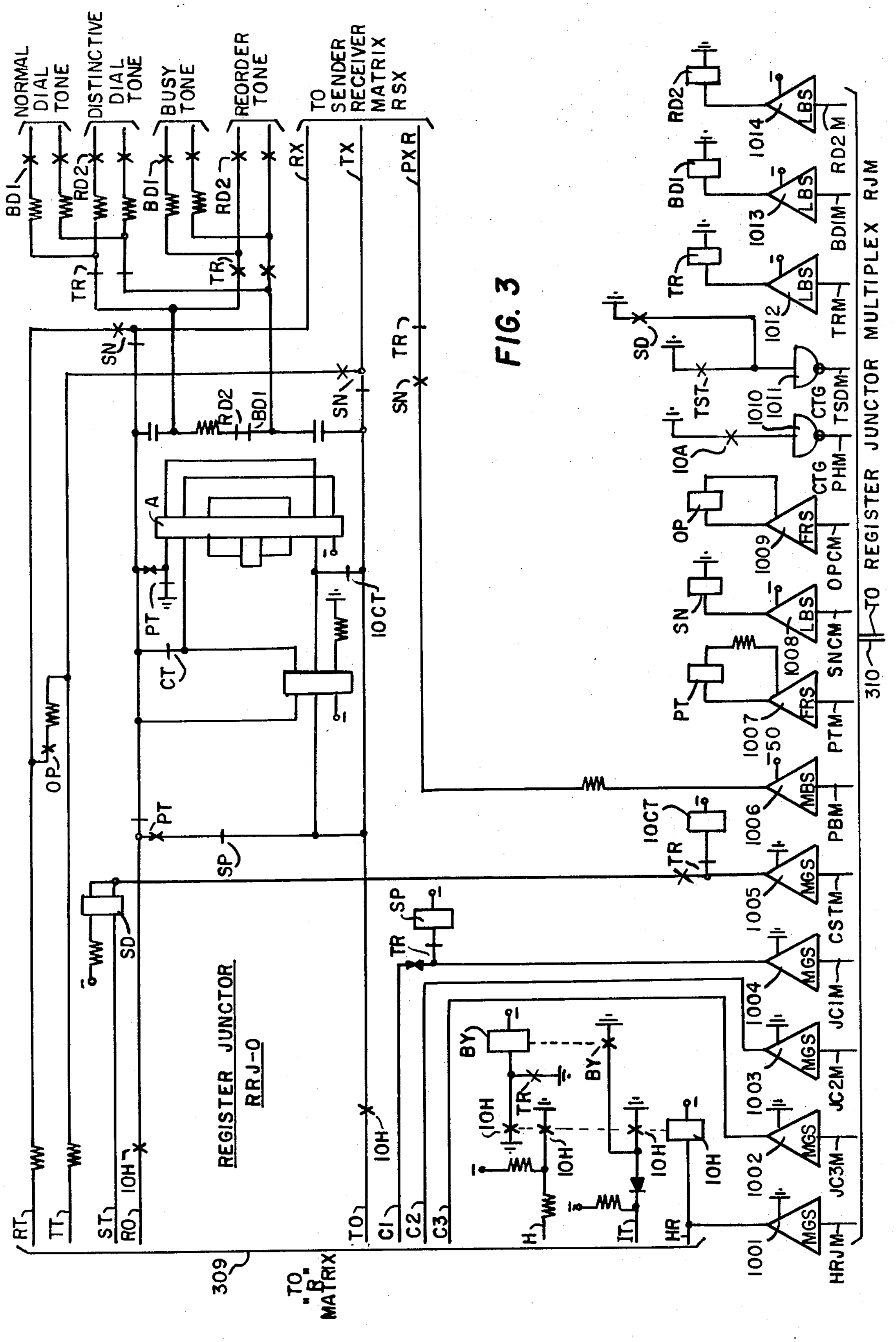
FIG. 3 is a schematic and functional block diagram of a register junctor.

The register junctor, shown in FIG. 3, is fully described in said REGISTER-SENDER patent application. Of interest here is the connection of the three leads RX, TX and PXR to the sender-receiver matrix RSX in FIG. 1. A negative 50-volt potential is applied to lead PXR when a signal on lead PBM operates the main battery switch 1006, if relay SN has been operated by a signal on lead SNCM activating the switch 1008, and relay TR is not operated. The devices MBS and LBS are transistor switches for applying negative potential to their output leads. The output of switch 1006 extends via a resistor, make contacts of relay SN, and break contacts of relay TR to lead PXR. Leads RX and TX are normally connected via break contacts of relay SN to leads TO and RO for receiving, and when relay SN is operated leads RX and TX are transferred to leads RT and TT for sending.

Register Memory

Figure 4:
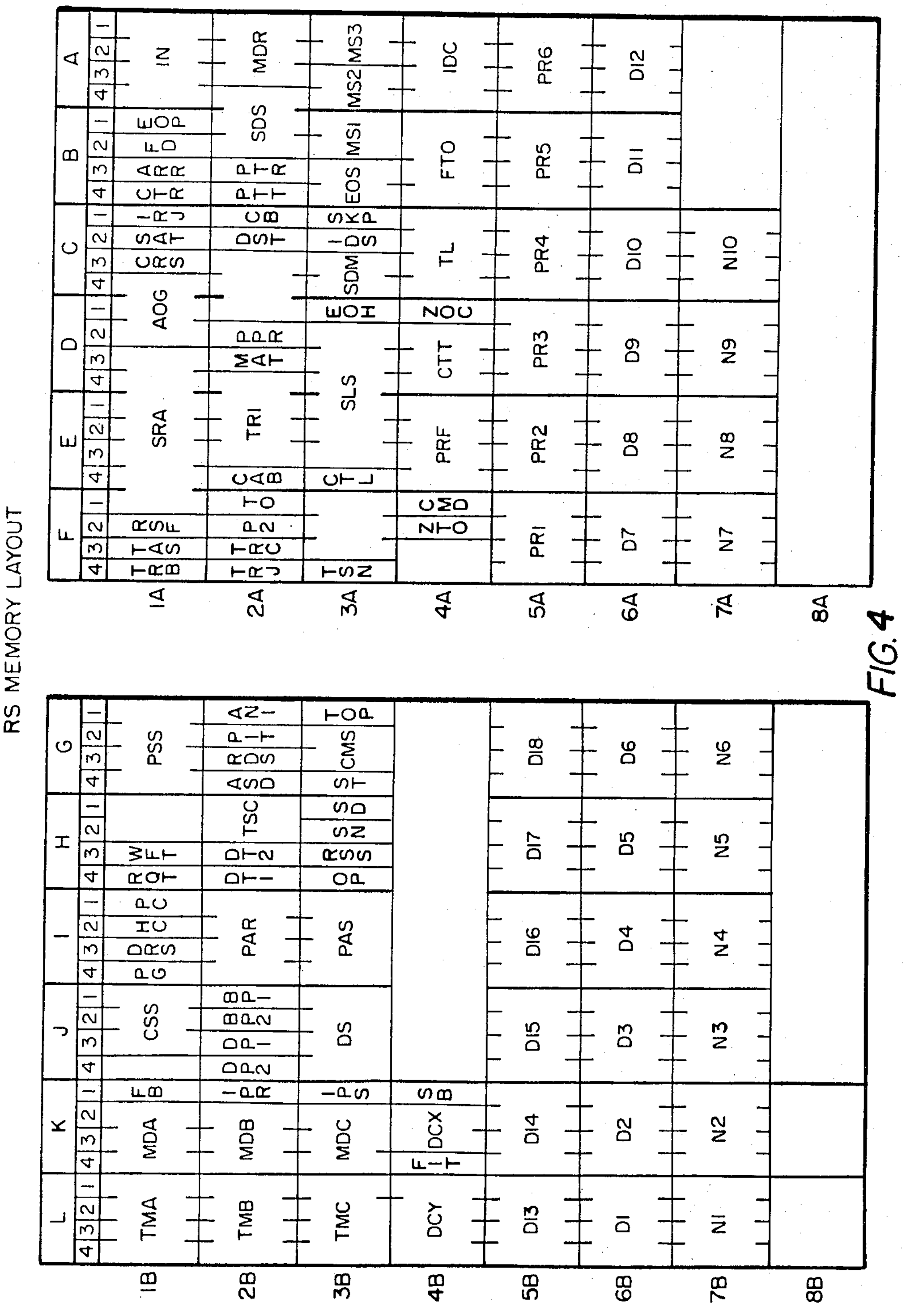
FIG. 4 is a memory layout drawing for one register junctor.

The register memory includes 192 blocks, each comprising 16 words of 24 bits individual to a register junctor. A timing generator shown in FIG. 6 of the REGISTER-SENDER patent application supplies time slot and sub-time slot signals, the time slots being individual to the register-junctors to select the block, and the sub-time slots being used to select two words in the block. The layout of the block of memory for one register junctor is shown in FIG. 4. The sets of two words are designated as rows. There are eight rows, each having a "right-hand" word with positions A–F and a "left-hand" word with positions G–L, each position comprising four memory bits. Rows 1–3 are control rows which are accessed twice during a time slot, with row 1 having sub-time slots Y1 and Y9, row 2 sub-time slots Y2 and Y10, and row 3 sub-time slots Y3 and Y11.

A full description of the items in the memory is provided in section D. REGISTER-SENDER MEMORY LAYOUT of the REGISTER-SENDER patent application. The items of particular interest for assignment and connection of senders and receivers occur in row 1 defined below. In these definitions DP is used for the data processing unit and RS for the register-sender subsystem.

AOG
1.0 Name — Assigned Matrix Outlet Group
2.0 Location
  Word 1A
  Bit Position C4, D1, D2
3.0 Functional Description
  The AOG is used by the DP to specify to the RS the type of unit on the outlet of the Sender-Receiver Matrix that is to be connected to the RRJ for sending or receiving. The values of the AOG field are:

AOG = 0 — No connection needed
  AOG = 1 — TCMF receiver
  AOG = 2 — MF receiver
  AOG = 3 — Spare
  AOG = 4 — MF sender
  AOG = 5,6,7 — Spare
  The AOG field will also be used to specify the length of timing for unit selection and attachment timeout. The AOG field will be generated by the DP as a function of the MDR and the MS1 to MS3 fields.

4.0 Control
  4.1 Set by the DP
  4.2 Reset by DP or by RS as part of normal disconnect.
5.0 Timing
  5.1 The AOG field and the Start Assignment Timing field (SAT) must be written in RS memory prior to the writing of IN = 2 for attaching a unit (receiver) for receiving the called number. The DP can write the CRS and SRA fields at the same time or any time before the assignment timeout (5 to 50 sec).
  5.2 The AOG and SAT fields must be written in the RS memory after the entire called number is received, attaching a receiver to receive the calling number. The DP should not write FD until the entire calling number is received. Once an idle unit is selected, the DP must write the CRS and SRA fields in RS memory.
  5.3 The AOG and SAT fields must be written in the RS memroy prior to or at the same time as FD for attaching a sender. Once an idle unit is selected, the DP must write CRS and SRA. After the RS attaches the sender it will interrupt the DP with TRI = 4 (sender connected).
  Attachment of a sender to send the prefix digits, the called number, or the calling number will take place before any sending starts.
6.0 Cross Reference
  6.1 SRA, CRS, SAT, CTR CRS
1.0 Name — Connect Receiver or Sender
2.0 Location
  Word 1A
  Bit Position C3
3.0 Functional Description
  The CRS field is used by the DP to instruct the RS to attach a particular unit (sender or receiver) on the outlet of the Sender-Receiver Matrix to the RRJ. The unit type is specified by the AOG field and the unit number (address) is specified by the SRA field.
4.0 Control
  4.1 Set by DP
  4.2 Reset by RS after unit is attached (RPC-equation 18)
5.0 Timing
  5.1 The CRS and SRA fields are written in RS memory after the DP has selected an idle unit of the type specified by the AOG. The AOG field is written in the RS memory prior to the CRS to allow the RS to time the selection and attachment function.
  5.2 There will be no DP interrupt for attaching a receiver for receiving the called or calling number.
  5.3 The RS will interrupt the DP after all sender attachments.

5.4 Unless the SAT field is used, the CRS field must be stored in the RS memory prior to or at the same time as the IN = 2, SDS = 5, or FD fields.

5.5 If an IN = 6 instruction is used, the CRS field must not be stored in the RS memory until a TRI = 8 interrupt is generated by the RS.

6.0 Cross Reference 6.1 AOG, SRA, SAT 7.0 Comments 7.1 The CRS field will not be reset by the RS if an assignment time out occurs.

CSS 1.0 Name — Connect Sequence State 2.0 Location

Word 1B

Bit Position — J1, J2, J3

3.0 Functional Description

The CSS field is an internal RS counter field used to sequence the operation of the Sender-Receiver Matrix connection function.

4.0 Control 4.1 Set by RS (RPS equations 10, 12)

4.2 Reset by RS (RPC E)

5.0 Timing 5.1 After starting operation the CSS is incremented every 10 ms.

5.2 If CSS = 0 within 70 ms, a timeout will occur.

6.0 Cross Reference — AOG, SRA, CRS, PG 7.0 Comments

Only one memory block's CSS field may be operating at any given time.

HC 1.0 Name — Hold Check 2.0 Location

Word 1B

Bit Position I2

3.0 Functional Description

The field is a maintenance trouble indicator field used to indicate an abnormal condition of the Sender-Receiver Matrix during connection or disconnection of a unit. This field will be used for localization of the trouble condition. This field or PC may be set whenever the trouble in Assignment TAS field is set. The timing associated with the connection checking is controlled by the Connection Sequence State (CSS) field.

4.0 Control 4.1 Set by RS (RPC-equations 11, 22, 45)

4.2 Reset by RS 5.0 Timing — None 6.0 Cross Reference — TAS, CSS, DRS

IN 1.0 Name — Instruction 2.0 Location

Word 1A

Bit Position A1, A2, A3, A4

3.0 Functional Description

The 4 bit IN field is an instruction field used by the DP to instruct the RS to perform a certain function. The present list of instruction is given below:

*IN* = 0 — This instruction is a no operation instruction.

This instruction should be used after the first code translation when the TL field is used to control the return of the RS to the DP for processing. It is also used (in conjunction with CTR) following an IN = 3 to instruct the RS to stop timing the terminating marker operation and wait for another instruction.

IN = 1 — Start Junctor Operation.

This instruction indicates to the RS that the RRJ identity has been determined by the RRJ translation and the RS can begin processing that RRJ. When IN = 1 it can only be modified to only a non zero value.

IN = 2 — Originating Frame (class of service) Translation Complete.

This instruction indicates that the results of the class of service translation have been written in the RS memory. If a receiver is required, IN = 2 indicates that SRA and AOG are also in memory. This instruction will always be given to the RS after an IN of 1, unless IN = 7, IN = 9, IN = 11, or FD (non-dial line) is given. For the non-dial case IN = 3 or 4 can be given immediately (less than 10 ms after giving FD) or at a later time.

IN = 3 — DP Working with Terminating Marker — First and Intermediate Paths.

This instruction indicates to the RS that the DP has seized an Idle Communication Register and Terminating Marker and is about to transmit the terminating frame. This instruction is given on all uses of the TM except the last.

IN = 4 — DP Working with Terminating Marker — Final Path.

This instruction is the same as IN = 3 except that it indicates the last request for the Terminating Marker.

IN = 5 — Retrial 1

This instructs the RS to initiate a terminating retrial. Retrial 1 is used when the retrial doesn't require the disconnection or attachment of a sender. With this instruction the RS will drop the path back to the register junctor. Any insertion or section junctor in the path at the time IN = 5 is given will be dropped, and as such, must be reconnected on the retrial.

IN = 6 — Retrial 2.

This instruction is the same as IN = 5 with the exception of sender attachment or disconnection. IN = 6 should be given when a retrial with a sender disconnection or attachment is required. IN = 6 also drops the entire terminating path to the RJ.

IN = 7 — Lock Out

This instruction indicates to the RS to lock out the line or trunk in the originating junctor or trunk. IN = 7 should not be reset until the next RS interrupt. When the RS interrupt after an IN = 7 is given, the TRI field will be a 6 (RS has disconnected from the network). When the IN = 7 is used, the type of lock out (or other) command shall be stored in the CTT field either prior to or at the same time as IN = 7.

IN = 8 — Return Line Busy Tone

This instruction is used to request the RS to return line busy tone. When this instruction is given, the RS will return with a TRI = 5 or CAB. If the RS times out on the application of line busy tone, it will interrupt the DP with TRI = 5. If the subscriber hangs up before the tone time out, the RS will return with CAB. This instruction should remain set until this interrupt occurs.

IN = 9 — Return Reorder Tone

This instruction is used to request the RS to return reorder tone to the originator from the RRJ. The response of the RS to this instruction is similar to that for IN = 8. This instruction shall be used only when reorder tone is to be applied from the register junctor. If reorder tone must be returned from the incoming trunk IN = 7 and the CTT field must be used.

IN = 10 — Terminating Marker Completed

This instruction is used to inform the RS that the Terminating Marker has performed its function. The RS, upon seeing IN = 10, will perform the cut-thru function for local terminating or will begin sending for an outgoing call. The RS will interrupt the DP with a TRI = 6 after cut-thru for local termination and after sending, sender disconnection, and cut-thru for trunk termination.

IN = 11 — Disconnect the RRJ

This instruction is used by the DP to request the RS to disconnect the RRJ from the network. If a sender or receiver is connected the RS will also drop the S/R matrix connection. IN = 11 may be set by the DP in RS memory at any time during the process of a call. When an IN = 11 instruction is received, the RS will interrupt the DP with a TRI = 6 (unless a trouble condition occurs).

IN = 12 — Clear Memory

This instruction is used to request the RS to set the RRJ to the idle state and clear its associated 16 work block of memory. IN = 12 shall be given to the RS only after a TRI = 6 interrupt.

IN = 13 — Clear Memory and Take RRJ Off Line

This instruction is used to request the RS to clear its memory and go in an off line state. In this state the idle test lead for that RRJ is kept busy. An RRJ can be removed from this state and put in a normal idle state by resetting the PSS field to zero. IN = 13 shall be given to the RS only after a TRI = 6 interrupt.

IN = 14 — Disconnect Sender or Receiver

This instruction is used to request the RS to disconnect the Receiver or Sender. For calls originated from touch calling coin telephones, IN = 14, together with the CB bit, is used to instruct the RS to make a coin test prior to disconnecting the receiver. The RS will interrupt the DP with a TRI of 7 following an IN = 14.

IN = 15 — Terminating Marker Complete — Trouble or busy condition encountered.

This instruction causes the RS to stop timing the TM operation and wait for another instruction.

4.0 Control 4.1 All instructions are set by the DP.

4.2 The RS will reset the IN field when it equals 5, 6, 12, and 13. For the remaining values, the DP will either modify or reset the IN field.

5.0 Timing 5.1 IN = 2 — This instruction should be given as soon as possible after giving the IN = 1. The DP can modify the IN field from 1 to 2 without the RS observing the IN = 1. The RS only looks for an IN field greater than zero to exit the idle state.

IN = 3 & 4 These instructions should be given just prior to sending the terminating frame to the TM. It should only be given after both a Communication Register or Terminating Marker are seized. The sender instruction and formatting of sending digits must also take place prior to the writing of IN = 4.

IN = 5 & 6 — When IN = 5 or IN = 6 is given the RS will release the complete terminating path and will generate a TRI = 8 interrupt after 450 msec (time required to release the path). The RS will reset the IN field when the TRI = 8 interrupt is generated. If a sender disconnection is required the RS will delay the TRI = 8 interrupt until the TRI = 7 interrupt has been serviced by the DP. If a sender connection is required the DP must set the SAT field in the RS memory before the TRI = 8 interrupt is generated by the RS. The DP shall not generate more than one retrial due to equipment malfunctions.

PC 1.0 Name — Pull Check 2.0 Location

Word 1B

Bit Position I1

3.0 Functional Description

This field is a maintenance indicator field used to indicate an abnormal condition of the Sender-Receiver Matrix during connection or disconnection of a unit. PC will be used for localization of the trouble condition. This field or HC may be set whenever the Trouble in Assignment (TAS) field is set. The timing associated with the connection checking is controlled by the Connection Sequence State field (CSS).

4.0 Control 4.1 Set by RS (RPC-equations 11, 22, 45)

4.2 Reset by RS 5.0 Timing — None 6.0 Cross Reference — TAS, CSS, DRS

PG 1.0 Name — Pull Ground 2.0 Location

Word 1B

Bit Position I4

3.0 Functional Description

The PG is an internal RS field used to apply pull ground on the Sender-Receiver Matrix during connection of a unit and also to hold the established matrix connection. The pulling of the Sender-Receiver Matrix provides a metallic path between the RRJ and the particular sender or receiver selected. Pulling of the matrix is accomplished by applying a ground on the unit side of the matrix and a potential on the RRJ side of the matrix.

4.0 Control 4.1 Set by RS (RPC-equation 14)

4.2 Reset by RS (RPC-equations 11, 20, 43)

5.0 Timing — See Connection Sequence States 6.0 Cross Reference — CSS, PC, HC, SRA, AOG, CRS

SN 1.0 Name — Operate the SN relay (in the RRJ)

2.0 Location Word 3B Bit Position H2

3.0 Functional Description

The SN field is used by the RS to control the operation of the SN relay in the RRJ. The SN relay is used to transfer the Transmission path for the Sender-Receiver Matrix from the receiving to sending path in the RRJ. The SN bit is set during sender and receiver attachments (for checking) and during sending when a sender is required.

4.0 Control
4.1 Set by RS (RSC-equations 21, 24, 28)
4.2 Reset by RS (RSC-equations 14, 20, 23, 27)
5.0 Timing
5.1 Operated during sender/receiver connection to complete pull path.
5.2 Operated during sending to make a metallic connection from sender to trunk.
6.0 Cross Reference — CSS
7.0 Comments
7.1 Refer to relay descriptions.

SRA
1.0 Name — Sender-Receiver Address
2.0 Location
Word 1A
Bit Position(s) D3, D4, E1, E2, E3, E4, F1
3.0 Functional Description
The SRA field is used by the DP to specify to the RS, the Unit address of a sender or receiver for attachment to an RRJ. The range of the SRA field for the different unit types as specified by the AOG field is as follows:

| | | |
|---|---|---|
| AOG — 1 | TCMF receiver | 1 ≤ SRA ≤ 120 |
| AOG = 2 | MF receiver | 1 ≤ SRA ≤ 36 |
| AOG = 4 | MF sender | 1 ≤ SRA ≤ 36 |
| AOG = 3, 5, 6, 7 | spare | SRA ≤ 120 |

4.0 Control
4.1 Set by DP
4.2 Modified by DP
4.3 Reset by DP at disconnect time
5.0 Timing
5.1 The SRA and CRS fields are written in RS memory after the DP has selected an idle unit of the type specified by the AOG. The AOG field is written in the RS memory prior to the CRS to allow the RS to time the selection and attachment function.
5.2 There will be no DP interrupt for attaching a receiver for receiving the called or calling number.
5.3 The RS will interrupt the DP after any sender attachment.
6.0 Cross Reference
6.1 AOG, CRS, SAT
7.0 Comments
If an address is assigned to a non-existent receiver or sender (e.g. MF sender number S1) trouble will be called in PSS = 1.

TAS
1.0 Name — Trouble in Assignment
2.0 Location
Word 1A
Bit Position F3
3.0 Functional Description
The TAS is a maintenance indicator field set by the RS to indicate an error or fault in the assignment process. The TAS bit will be set if the error or fault is detected either during connection or disconnection of a unit on the Sender-Receiver matrix.
4.0 Control
4.1 Set by RS (RPC-equations 11, 22, 45)
4.2 Reset by DP
5.0 Timing — None
6.0 Cross Reference — TRB, CSS, DRS Multiplex to Senders and Receivers
The multiplex for senders and receivers and circuits associated therewith are shown in FIG. 1. The multiplex circuits themselves in unit RSM, and block 1201 of unit RIS–A are generally similar to the corresponding circuits of unit RJM and RIF for the junctor multiplex, which are shown in detail in said REGISTER MULTIPLEX patent application, and therefore are indicated only by single blocks.

One MF sender out of a maximum of 36, one MF receiver out of a maximum of 36, and one DTMF receiver out of a maximum of 120 are shown in FIG. 1. The RSX unit is a single stage matrix comprising 24 8 × 10 matrix switches, with three of the crosspoints, of one matrix switch shown in FIG. 1 for connecting the register junctor RRJ–O respectively to the MF sender, the MF receiver and the DTMF receiver shown. Each crosspoint is a reed relay having a pull winding shown at the bottom, a hold winding at the top, and three sets of make contacts. As indicated each register junctor is connected in multiple to a plurality of crosspoints, and each sender and receiver is also connected in multiple to a plurality of crosspoints.

As shown in detail in the MF sender, there is a relay 12A and a relay 12H. Relay 12A has two windings connected via resistors to the negative and ground terminals of the main battery, the other sides of the windings being connected respectively via break contacts of relay 12H to the tip and ring conductors via the crosspoint to the register junctor leads TX and RX. A signal on lead PGM from the multiplex circuits operates a relay driver 1233 which supplies ground potential initially for pulling the crosspoint relay, and then holding it. The asterisk indicates make before break contacts for relay 12H. The ground potential from relay driver 1233 via the lower break contacts of relay 12H, in conjunction with negative battery potential on lead PXR from the register junctor selects and pulls a crosspoint relay. Relay 12A then operates via a path through the operated crosspoint contacts and a path in the register junctor. A path is then completed via the ground from relay 1233, make contacts of relay 12A, break contacts of relay 12H, the winding of relay 12H, and the hold winding of the crosspoint relay and a set of its contacts to battery potential. After the hold relay 12H operates, relay 12A is disconnected, and relay 12H via the ground from relay driver 1233 via its own make contacts and a resistor, holds itself and the crosspoint relay. Gates 1234 and 1235 are main battery test circuits which operate in response to detecting main battery negative potential to supply a true signal on their respective output leads. Each of the senders and receivers includes corresponding A and H relays and interface circuits similar to 1233, 1234 and 1235, indicated for the MF receiver and TCMF receiver by blocks.

The MF sender also includes a relay driver 1232 for operating relay TOP for the "time on period" of the tones during sending. The block 1231 indicates a set of relays controlled by relay drivers from the four leads MS1M through MS8M, to apply tones during sending from a tone source. Each digit is received in binary code on the four leads MS1M through MS8M and is converted to a code for applying two out of six tones via contacts of relay TOP and condensors and a transformer to the tip and ring leads, through the crosspoint connection to leads PX and RX at the register junctor.

The MF receivers include tone detectors indicated by block 1241 to supply respective signals to the six leads TOM through T10M. If more than two tones are received for a digit, a signal appears on lead R0M, indicating an error condition.

Dual tone (DTMF) or Touch Calling (TCMF) multifrequency refers to a signaling system for subscriber calling from telephone instruments equipped with sets of pushbuttons, in which each digit is represented by two tones, namely one out of four high frequency tones and one out of four low frequency tones. In the Bell System that is identified as TOUCH TONE service.

The DTMF receivers have tone detectors indicated by block 1251. The code comprises one out of four low frequency tones and one out of four high frequency tones for each digit. The low frequency tone is detected and encoded on the two leads KTR and LTR, while the high frequency tone is detected and encoded on the two leads MTR and NTR.

For sending the digit in binary coded decimal is received from the read buffer and leads RRB J1 through RRB J4 and used via gates 1211 to 1214 to selectively set the appropriate ones of four latches MFSD1 through MFDS8. The outputs from these latches are coupled through the multiplex circuits of block 1201 and RSM to the four leads MS1M through MS8M of the selected sender. The tone on period is determined by bit G1 as indicated on lead RRB G1, which in conjunction with the timing signal RTG SET DS via gate 1214 sets a latch TOP. The output of this latch via the multiplex circuits supply the signal to lead TOM of the selected sender. The signal RTG SET DS as indicated by the output of a gate in FIG. 6 of the REGISTER-SENDER patent is true during coincidence of signals on leads Y11 and X4.

The pull ground for selecting the sender or receiver is controlled by bit I4 of word 1B of memory. The signal on lead RTG SET PG is obtained from a gate in FIG. 6 of the REGISTER-SENDER patent which is enabled during coincidence of signals on leads Y9 and X4, and this signal in coincidence with the signal on lead RRB I4 via gate 1216 sets latch PG in FIG. 1. The output of this latch via the multiplex circuits is supplied to a lead PGM of a selected MF sender, lead PGMR of a selected MF receiver or lead PGTR of a selected DTMF receiver.

The scan signals from the senders and receivers as received from the multiplex circuits are shown at the bottom of block 1201 as signals RSM PC through RSM ERC. The PC and HS signals are from the test gates such as 1234 and 1235 in the sender or corresponding test gates in a receiver. The signal ERC is multiplexed from lead ROM of a selected MF receiver for indicating an error condition. A received digit appears at the output of the multiplex circuits in binary coded decimal form on the four leads RSM DR1 through RSM DR8. Special gates in blocks 1201 are used to convert the code on the six leads from an MF receiver or the four leads from a DTMF receiver into the binary coded decimal form on these four leads.

Whereas the addressing for the register junctor multiplex circuits is determined by the sequentially occurring time slot signals, those for the senders and receivers are determined by an address stored in memory as received from the data processing unit. This address in word 1A comprises a field A0G and SRA. The address appears in the read buffer during subtime slots Y1 and Y9 of the time slot of the associated register junctor. During sub-time slot Y1 this address is transferred into a set of latches shown in FIG. 1, comprising three latches AOG1 through AOG4, only the output of latch AOG2 being shown; and seven latches SRA1 through SRA64, only the outputs of latches SRA2 through SRA32 being shown. The timing of the transfer is controlled by a latch SET SRA shown in FIG. 6 of the REGISTER-SENDER patent which is controlled by input gates during coincidence of signals on leads Y1 and X2 to be set in response to the signal on lead W6 and reset in response to the signal on W11. The output of this latch appears via an AND gate to lead RTG SET SRA, which in FIG. 1 supplies an input to AND gates 1201 through 1210. The latches are then set selectively in accordance with the signals on leads RRB C4 through RRB F1. The output of the three AOG latches is decoded by circuit 1221, with only three of the possible output signals being decoded as RIS STC for selecting a DTMF receiver, RIS SMR for selecting an MF receiver, and RIS SMS for selecting an MF sender. The outputs of the SRA latches are decoded by circuits 1222 and 1223 to provide signals on eight leads RIS AAO through RIS AA7, and 15 leads RIS ABO through RIS AB14 as shown. These signals select a specific sender or receiver within each group.

Figure 6:
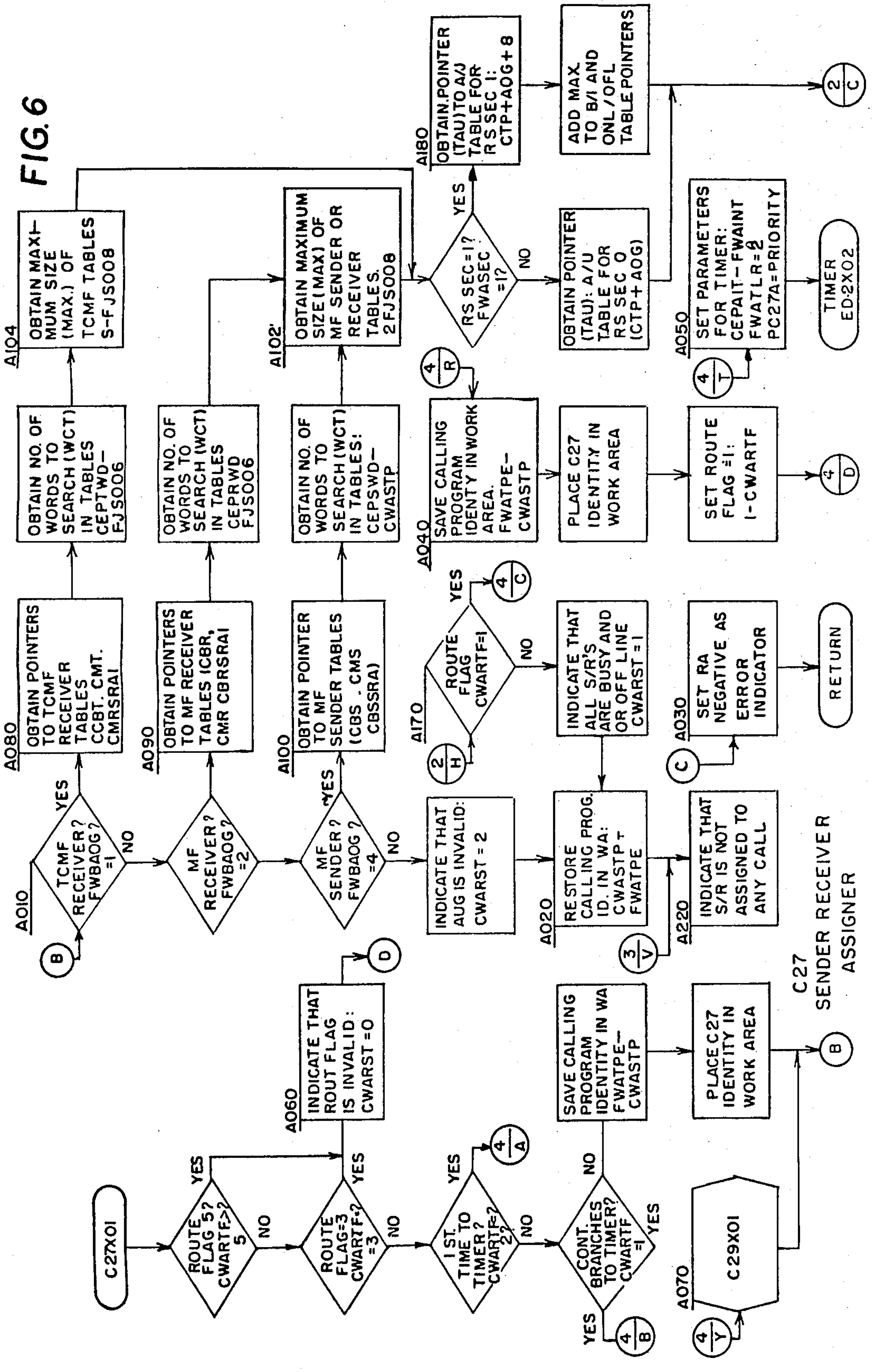
FIGS. 6–6C comprise a software flowchart of the program module for sender or receiver assignment.
Figure 6A:
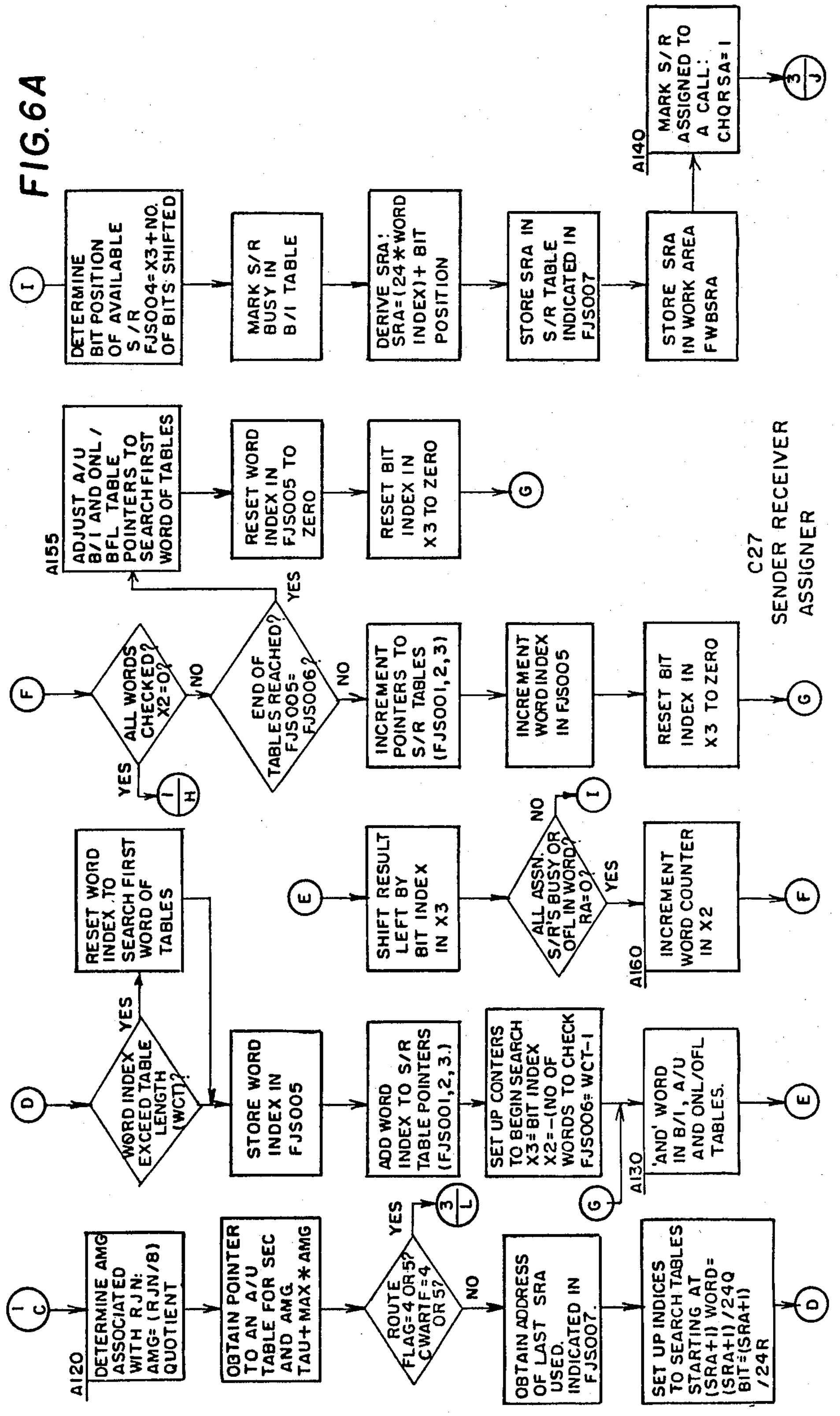
Figure 6B:
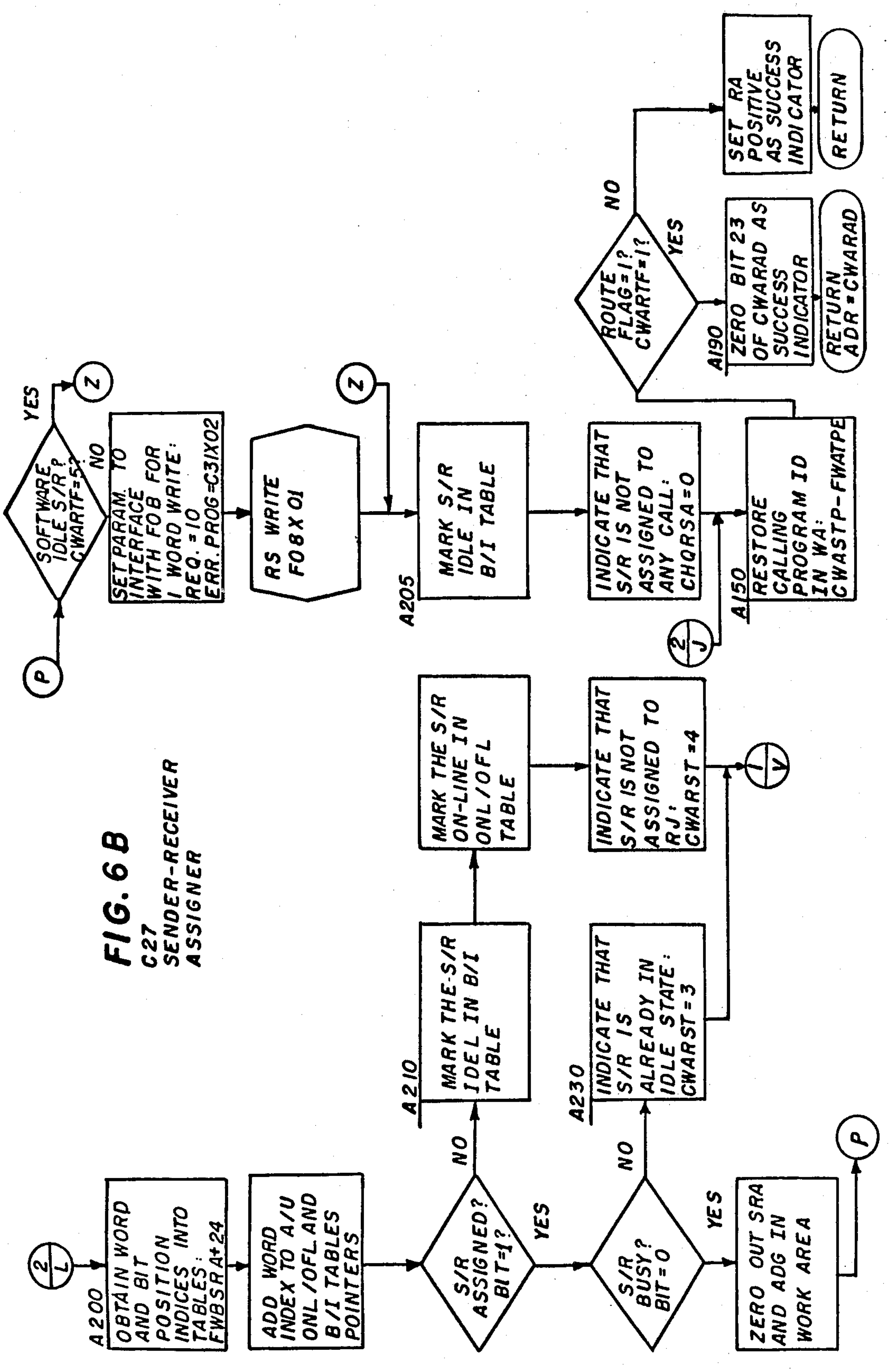
Figure 6C:
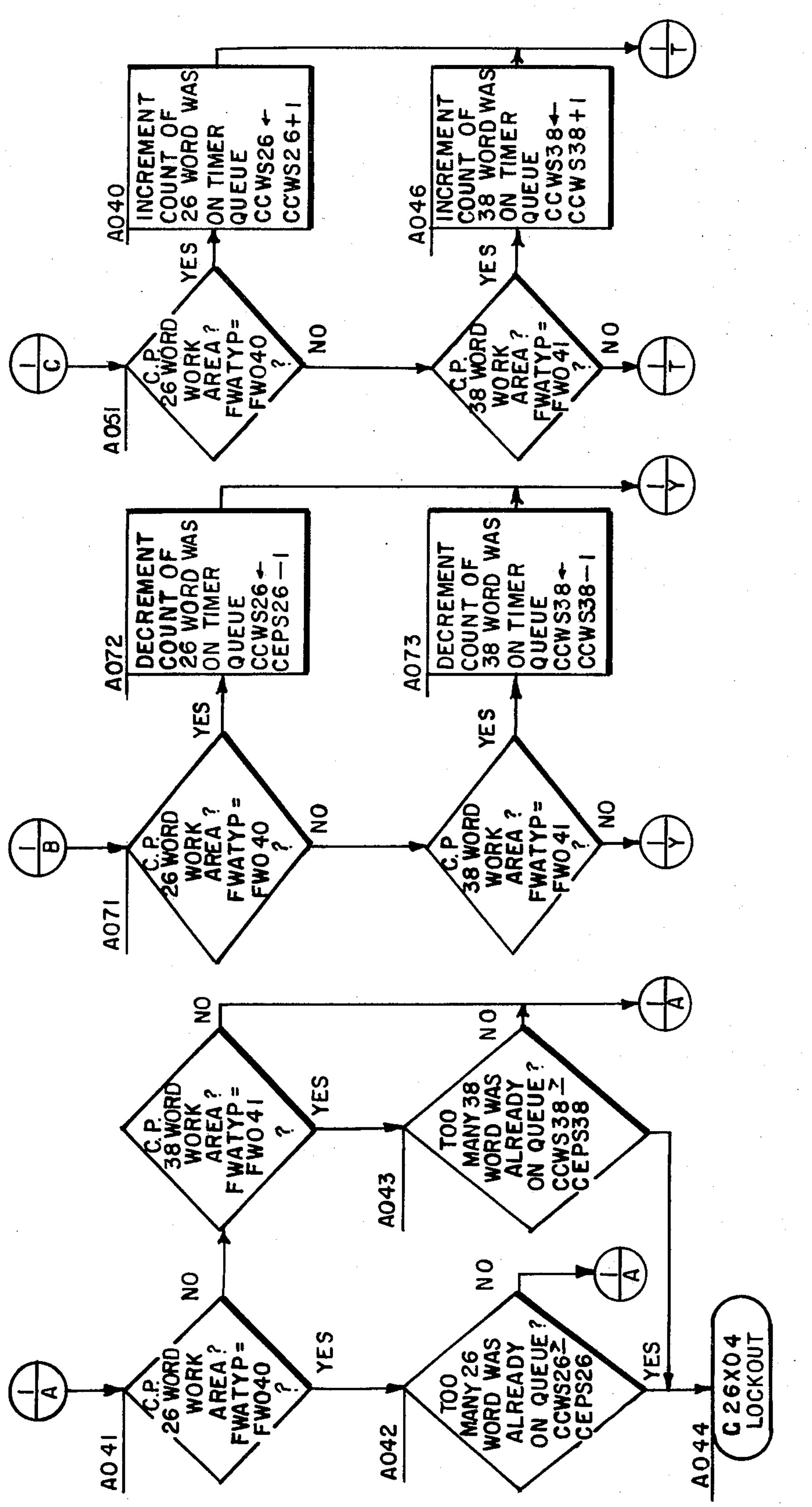
Figure 7:
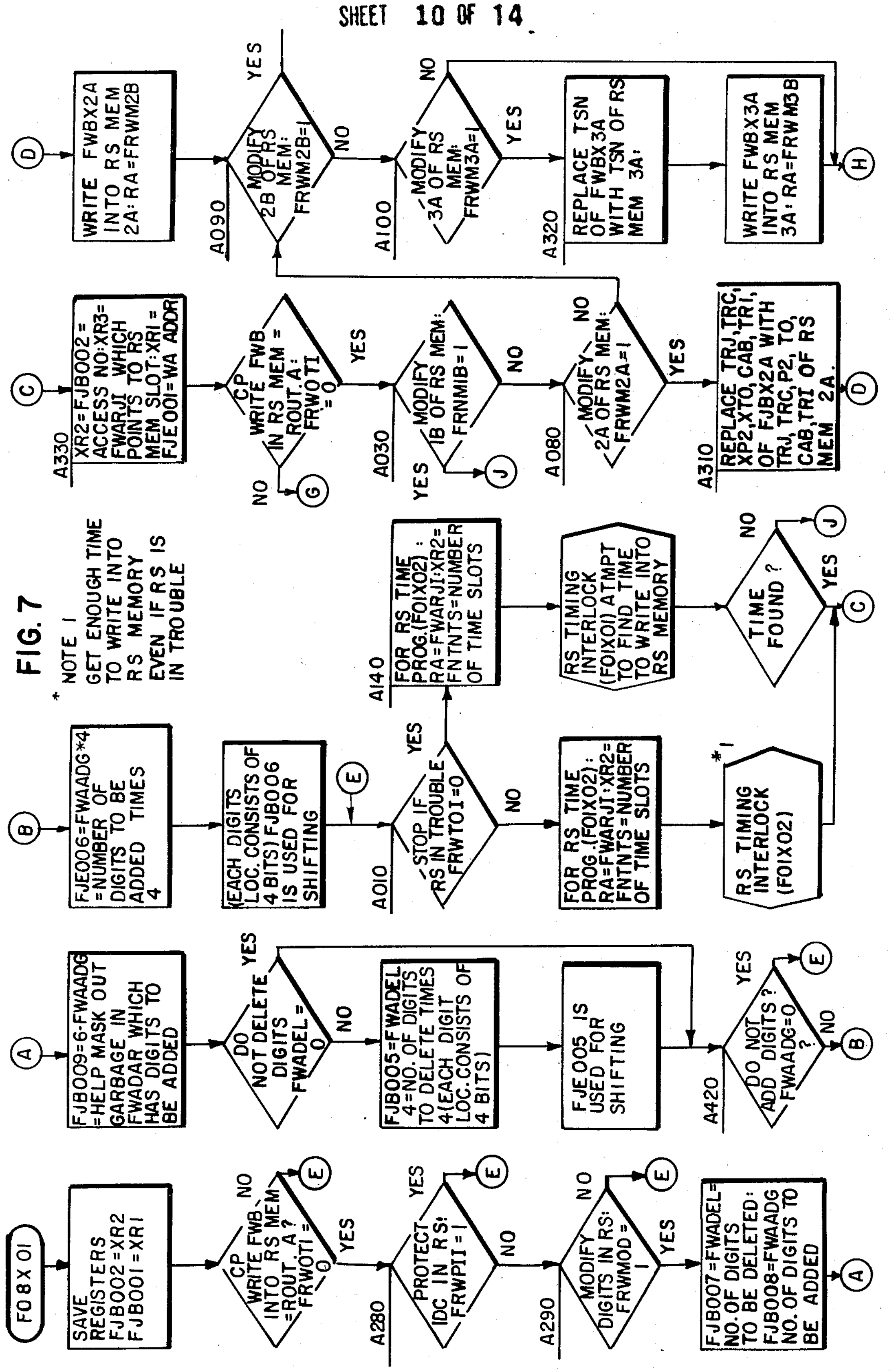
FIGS. 7–7D comprise a software flowchart of the register-sender access program module.
Figure 7A:
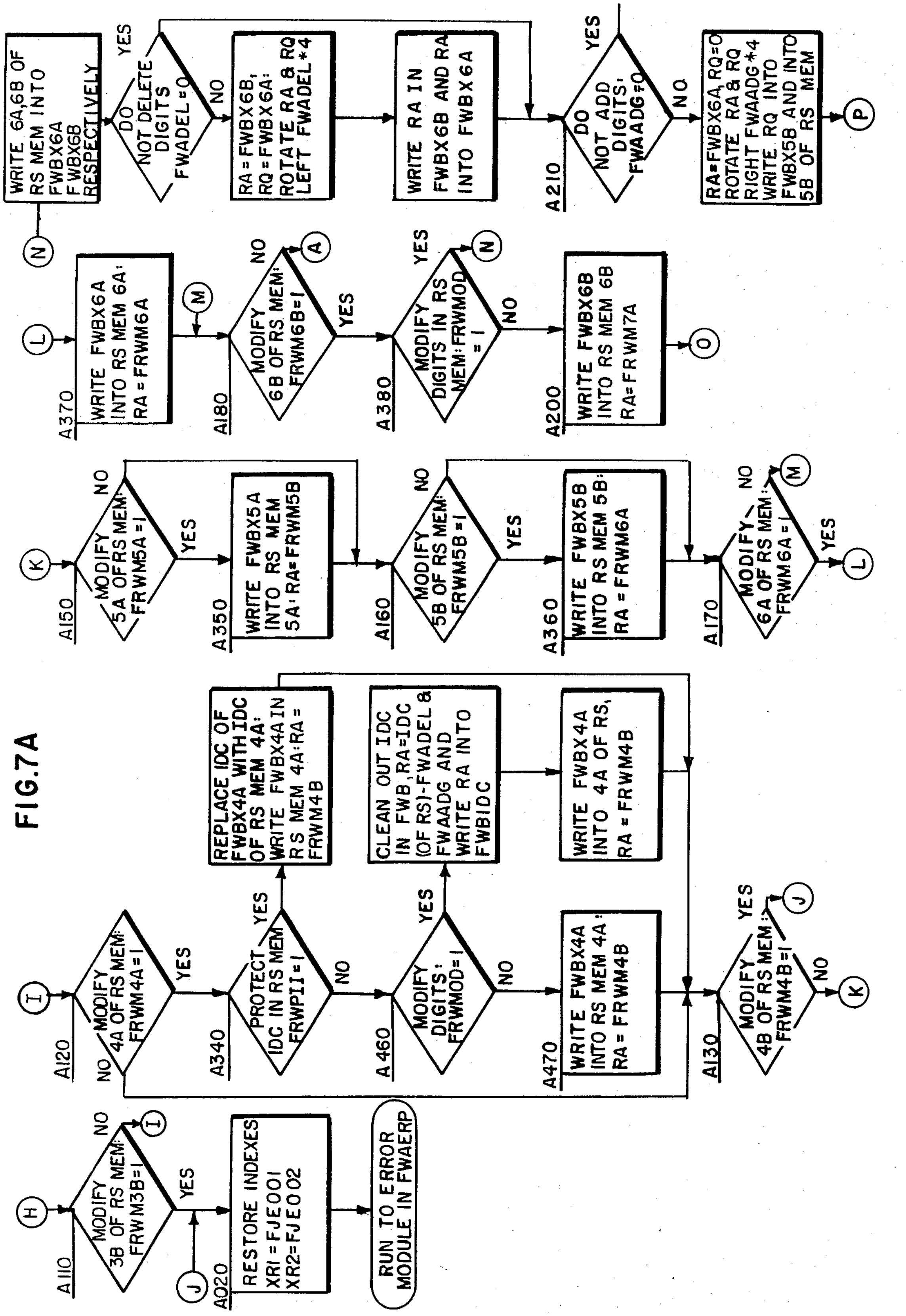
Figure 7B:
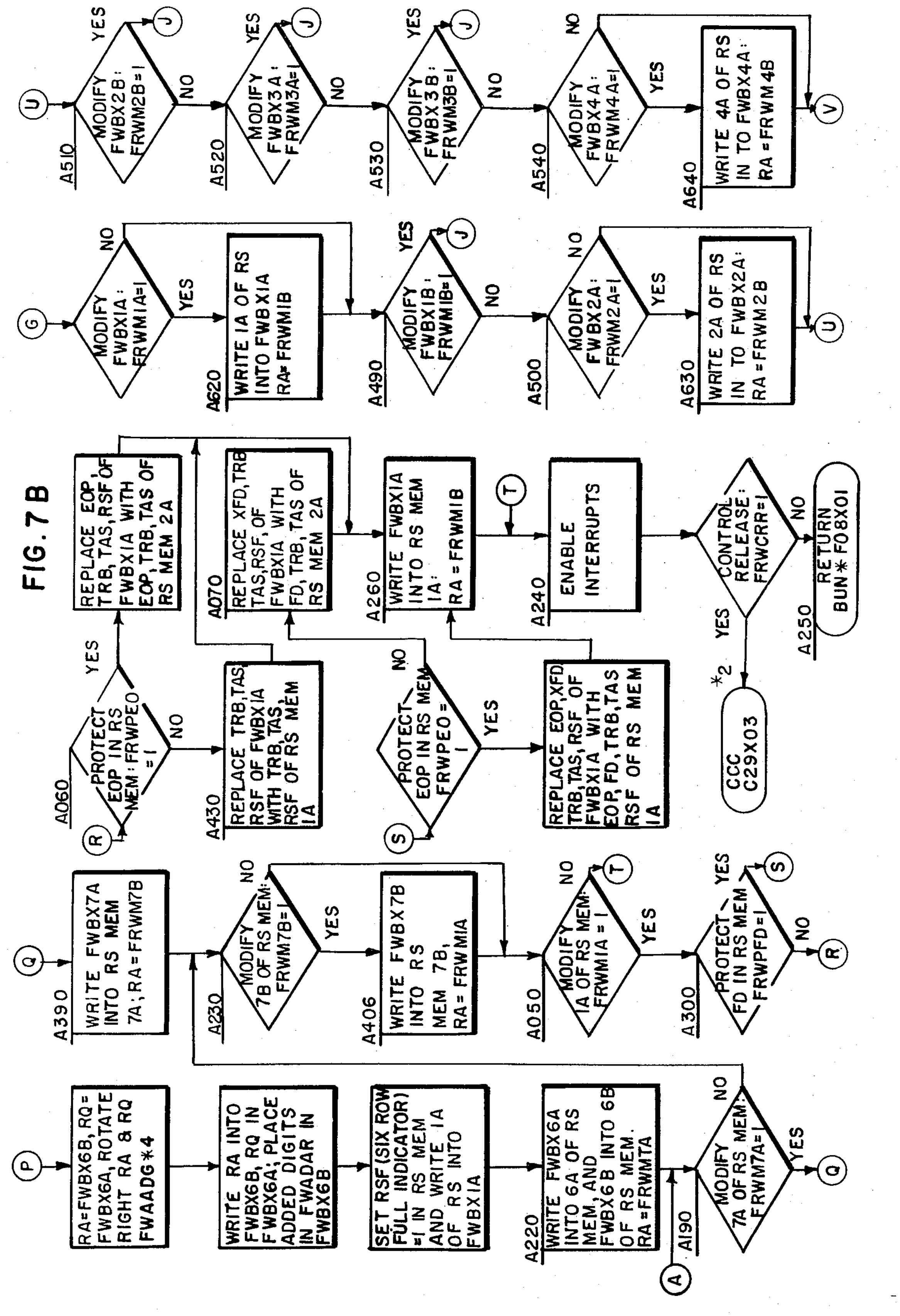
Figure 7C:
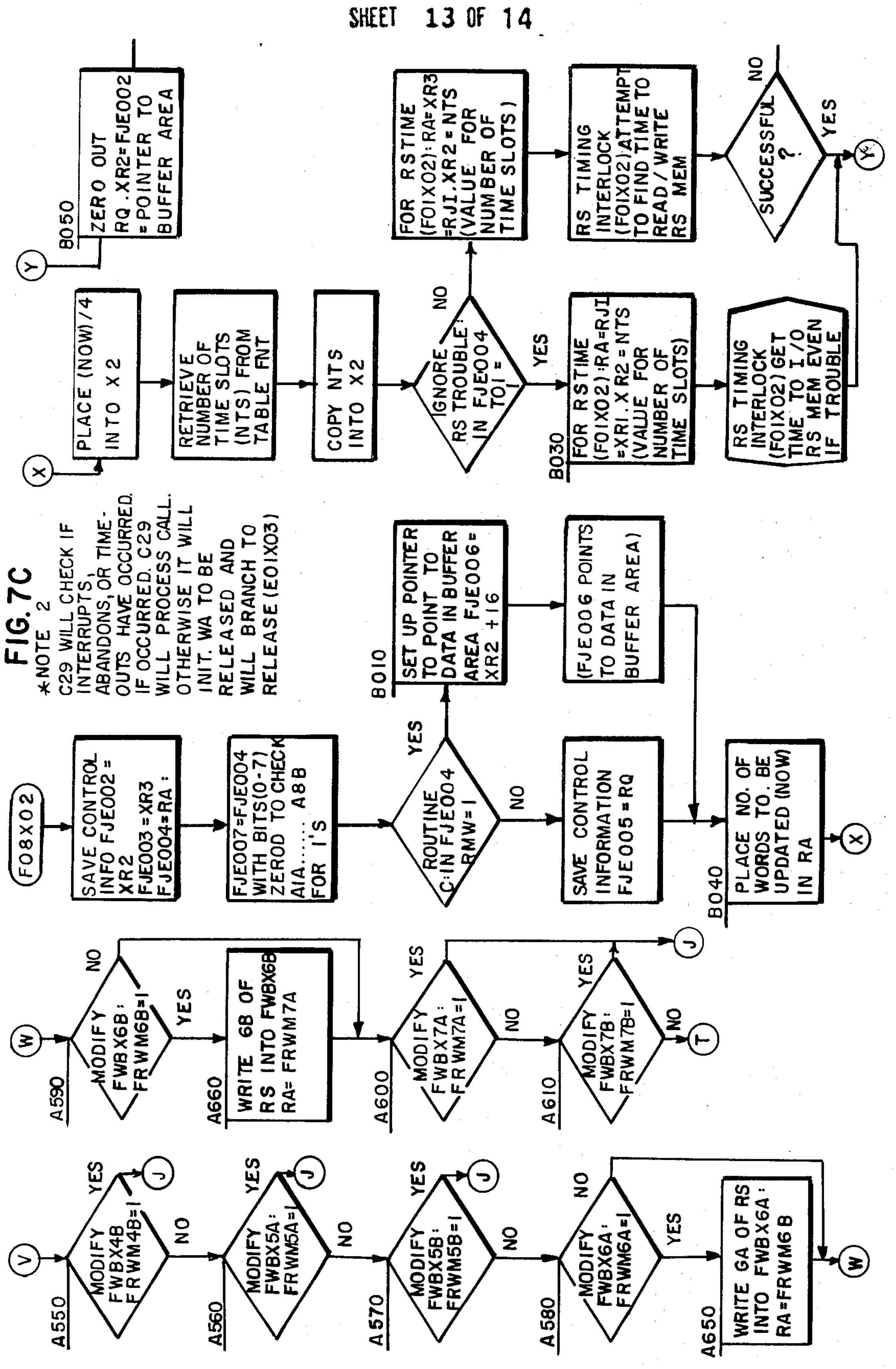
Figure 7D:
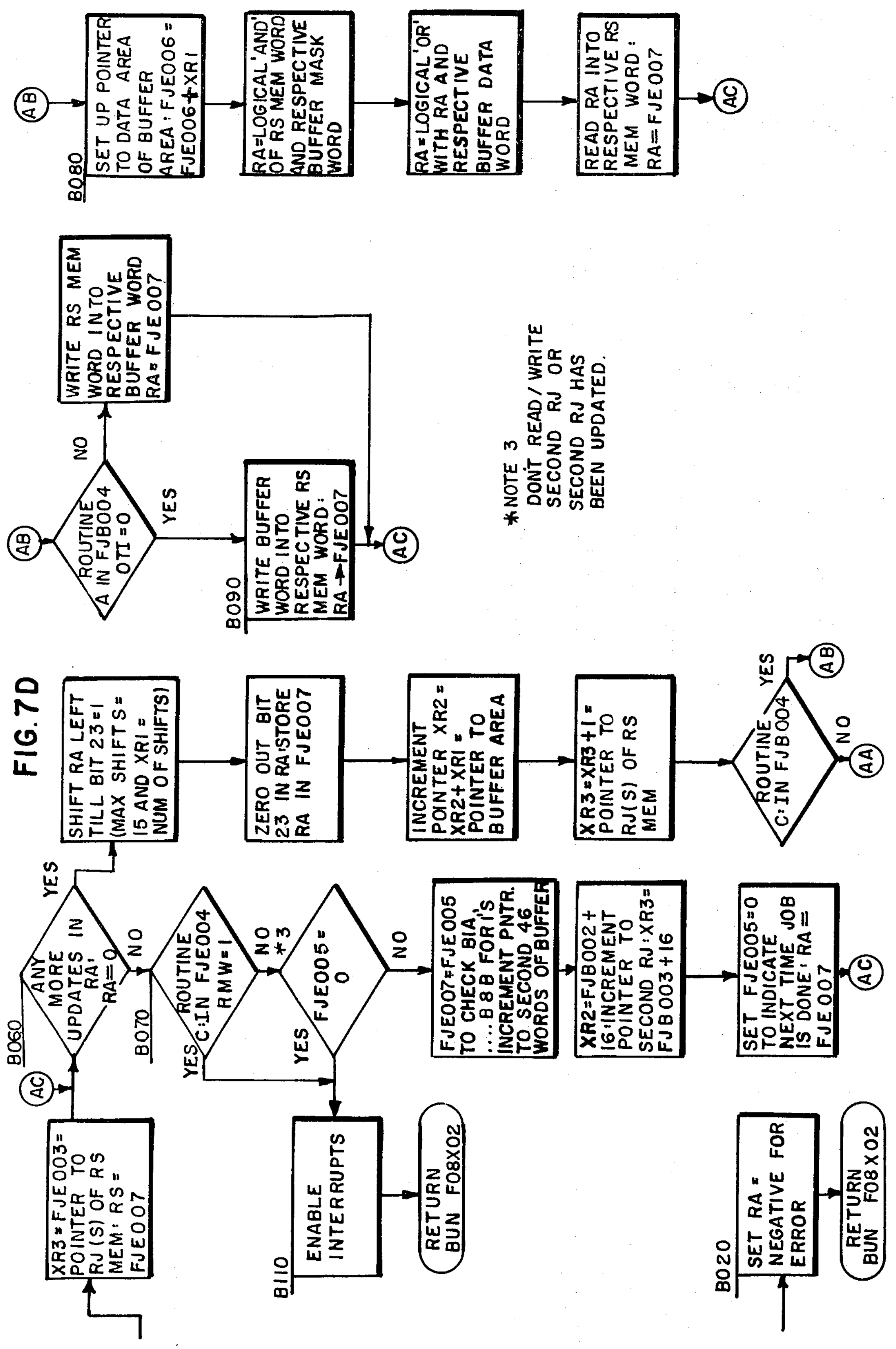

The latches in unit RIS are reset in response to a signal on lead RTG RST DL which as shown in FIG. 6 of the REGISTER-SENDER patent at the output of a gate is true during coincidence of signals on leads Y11 and X1.

COMMON LOGIC CIRCUITS

The common logic circuits 202 are described in the REGISTER-SENDER patent application, principally in the form of Boolean equations in section K. EQUATIONS FOR REGISTER CONTROL. The equations for row 1 are repeated below.

Process Controller (RPC) Equations

RPC Basic Internal Equations

1) SET RCB-CL - (RPB-PSS=0)(RRB-IN=0$\overline{\text{(RJM-PH)(RTG-Y1)}}$

2) SET RCB-NPSS=1 = (RRB-PSS=0)($\overline{\text{RRB-IN-0}}$(RJM-PH)(RTG-Y1)

SET RCB-HRJ

START TIMER (TIMP*

* THE TIMER (TIM) CONSISTS OF THE TMA AND MDA FIELDS

START TIM MEANS WRITING TMA = 1 and MDS = 0

3A) SET-RCB-TRBC - (RRB-PSS=0)(RTG-Y 1)(RRB-IN=0)(RJM-PH)
(TIM=100MS)

3B) SET-RCB-TRBC = (RRB-PSS=0)(RTG-Y 1)($\overline{\text{RRB-IN=0}}$)($\overline{\text{RJB-PH}}$)
(TIM - 100MS)

4) SET RCB-NPSS=2 = (RRB-PSS=1)(RRB-IN=2)($\overline{\text{RRB-SAT}}$)($\overline{\text{RRB-CRS}}$)
(RTG-Y1)
START TIM

5) START TIM = (RRB-PSS=1)(RRB-IN-2)(RRB-CTR)(RRB-SAT+RRB-CRS)(RTG-Y1)

6) SET RCB-NPSS-5 = (RRB-PSS=1)(RRB-FD)(RRB-SAT+RRB-CRS)
(RTG-Y1)
START TIM

7) SET RCB-NPSS=6 = (RRB-PSS=1)(RRB-FD)($\overline{\text{RRB-SAT}}$)($\overline{\text{RRB-CBS}}$)
(RTG-Y1)

8) SET RCB TRBC = (RRB-PSS=1)(RRB-IN-2)RRB-FD)(TIM=5 SEC)
(RTG-Y1)

10) WRITE CSS=1 = (RRB-CRS)(RRB-CSS=0)($\overline{\text{RCB-BY}}$)($\overline{\text{RMN-DMC}}$)
(RTG-Y1)(RRB-PSS$\leq$5)
START TIM 11) SET RCB-TRBC = (RTG-Y1)($\overline{\text{CSS=0}}$)(TIM-70MS)+(RRB-CRS)
WRITE HC-RSM-HC (RTG-Y1){[(RRB-CSS=1)(RSM-HC+RSM-PC)]
WRITE PC-RSM-PC +[(RRB-CSS-3)($\overline{\text{RSM-HC}}$+RSM-PC)]+[(RRB-CSS-5)
WRITE TAS ($\overline{\text{RSM-HC}}$+RSM-PC)]+[(RRB-CSS=6)($\overline{\text{RSM HC}}$
RESET RCB-BY +RSM-PC)]}
INHIBIT WRITE PG 12) ADD ONE TO CSS = ($\overline{\text{RRB-CSS=0}}$)($\overline{\text{EQUAT 11}}$)
(WHEN CSS $\geq$ 1)

13) SET RCB-BY = (RRB-CRS)(RRB-CSS=1)($\overline{\text{RRB-TAS}}$)(RTG-Y9)

14) WRITE PG = (RRB-CRS)(RRB-CSS=1)($\overline{\text{RSM-HC}}$))RTG-Y1)

16) SET RCB-PB = (RRB-PG($\overline{\text{RRB-CSS-6}}$)($\overline{\text{RRB-CSS=0}}$)(RTG-Y9)

17) SET RCB-OPC = [(PRB-CSS=4)+(RRB-CSS=5)]($\overline{\text{RRB-TAS}}$)(RRB-CRS)
(RTG-Y9)

18) INHIBIT WRITE CSS = (RRB-CSS=6)(RSM-MC)($\overline{\text{RSM-PC}}$)(RTG-Y1)
INHIBIT WRITE SAT
INHIBIT WRITE CRS
START TIM
RESET RCB-BY 19) SET RCB-TRBC = (RRB-PSS≤5)[(RRB-CRS)+(RRB-SAT)]($\overline{\text{RMN-DIS}}$)
(RTG-Y1)·{[TIM≡MCC-SRTN][(RRB-AOG=1)(MCC-RTC-NL)
+(RRB-AOG=2)($\overline{\text{MCC-RMR-NL}}$)+(RRB-AOG-4)($\overline{\text{MCC-RMS-NL}}$)
+[TIM≡MCC-SRTL][(RRB-AOG=1)(MCC-RTC-NL)+
(RRB-AOG-2)(MCC-RMR-NL)+(RRB-AOG-4)
(MCC-RMS-NL)]}

20) INHIBIT WRITE PG = (RRB-PSS=4)(RRB-DRS)(RRB-PG)(RTG-Y1)

21) INHIBIT WRITE DRS = (RRB-PSS-4)[($\overline{\text{RRB-DRS}}$)+$\overline{\text{RRB-PG}}$)($\overline{\text{RSM-HC}}$)]
(RTG-Y1)
SET RCB-NPSS=3

22) WRITE HC-RSM-HC = (RRB-PSS=4)(RRB-DRS)($\overline{\text{RRB-PG}}$)(RSM-HC)
WRITE PC-RSM-PC (RTG-Y1)
WRITE TAS
SET RCB-TRBC

23) SET RCB-NPSS=5 = (RRB-PSS=3)(RRB-FD[(RRB-SAT)+(RRB-CRS)]
(RTG-Y1)

24) SET RCB-NPSS=6 = (RRB-PSS=3)[(RRB-FD)($\overline{\text{RRB-SAT}}$)($\overline{\text{RRB-CRS}}$)+
(RRB-EOP)](RTG-Y1)

25) SET RCB-NPSS=4 = (RRB-PSS=3)(RRB-DRS)(RTG-Y1)

27) SET RCB-NPSS=6 = (RRB-PSS-5)($\overline{\text{RRB-SAT}}$)($\overline{\text{RRB-CRS}}$)(RTG-Y1)
SET RCB-TRIC=4

29) WRITE RQT = ($\overline{\text{RRB-WFT}}$)($\overline{\text{RRB-RQT}}$)(RCB-RGTV)(RTG-Y9)
START TIM

30) INHIBIT WRITE WFT = (RRB-WFT)(RRB-CTR)

31) START TIM = (RRB-WFT)(RRB-CTR)($\overline{\text{RRB-PSS-11}}$)

32A) SET-RCB-TRBC = (RRB-WFT)($\overline{\text{RRB-CTR}}$)(TIM-5SEC)(RTG-Y1)

32B) SET-RCB-TRBC = (RRB-RQT)(RPI-TRS)(TIM=20SEC)(RTG-Y1)

33) SET RCB-TRR = (RRB-RQT) ($\overline{\text{RPI-TRS}}$) (RRB-DRS) (RTG-Y1)

($\overline{\text{RRB-FB}}$)

34) INHIBITWRITE RQT = (RRB-RQT) (RPI-TRS) (RCB-TRR) (RTG-Y9)

WRITE WFT

START TIM

35) START TIM = (RRB-CTR) [(RRB-PSS=6) + (RRB-PSS=7)]

36) SET RCB-TRBC = [(RRB-PSS-6) + (RRB-PSS=7)] ($\overline{\text{RRB-WFT}}$) ($\overline{\text{RRB-RQT}}$)

(RTG-Y1) · ($\overline{\text{RRB-IN-1}}$) · {[(RRB-IN=3) + (RRB-IN=4)]

(TIM=1.5SEC) ([($\overline{\text{RRB-IN-3}}$) ($\overline{\text{RRB-IN=4}}$)] (TIM-5SEC)}

37) SET RCB-NPSS=10 = (RRB-PSS=6) (RRB-ARR) (RRB-IN=14 (RTG-Y1)

START TIM

38) SET RCB-NPSS=5 = (RRB-PSS=6) (RRB-ARR) ($\overline{\text{RRB-IN=14}}$) (RTG-Y1)

INHIBIT WRITE ARR

START TIM

INHIBIT SET RCB-TR

41) SET RCB-NPSS=10 = (RRB-PSS<10) [(RRB-IN=6) + RRB-IN=7) +

START TIM (RRB-IN=8) + (RRB-IN=9) + (RRB-IN=11)] (RTG-Y1)

42) SET RCB-NPSS=12 - (RRB-PSS<10) (RRB-IN=5) (RTG-Y1)

START TIM

43) INHIBIT WRITE PG = (RRB-PSS=10) (RRB-PG(RTG-Y1)

WRITE DRS

45) WRITE HC-RSM-HC = (RRB-PSS-10) ($\overline{\text{RRB-PG}}$) (RRB-DRS) (RSM-HC) (RTG-Y1)

WRITE PC=RSM-PC

WRITE TAS

SET RCB-TRBC

46) SET RCB-NPSS=12 = (RRB-PSS=10 ($\overline{\text{RRB-PG}}$) ($\overline{\text{RRB-IN-8}}$) ($\overline{\text{RRB-IN=9}}$)

[($\overline{\text{RRB-DRS}}$) + (RRB-DRS) ($\overline{\text{RSM-HC}}$) ($\overline{\text{RRB-IN=6}}$)

($\overline{\text{RRB-ARR}}$)] (RTG-Y1)

47) SET RCB-NPSS=11 = (RRB-PSS=10 ($\overline{\text{RRB-PG}}$) ($\overline{\text{RRB-DRS}}$) (RTG-Y1)

START TIM [(RRB-IN=8) + (RRB-IN=9)]

48) SET RCB-NPSS-6 = (RRB-PSS=10) ($\overline{\text{RRB-PG}}$) (RRB-DRS) ($\overline{\text{RSM-HC}}$)

SET RCB-TRIC=7 ($\overline{\text{RRB-IN=6}}$) ($\overline{\text{RRB-IN=8}}$) ($\overline{\text{RRB-IN=9}}$) (RBB-ARR) ·

INHIBIT WRITE ARR (RRB-WFT) ($\overline{\text{RRB-ROT}}$) (RTG-Y1)

INHIBIT WRITE DRS

49) SET RCB-NPSS=11 = (RRB-PSS=10) ($\overline{\text{RRB-PG}}$) (RRB-DRS) ($\overline{\text{RSM-HC}}$)

SET RCB-TRIC=8 ($\overline{\text{RRB-WFT}}$) ($\overline{\text{RRB-RQT}}$) (RTG-Y1)

INHIBIT WRITE DRS [(RRB-IN=8)+(RRB-IN=9)]

50 SET RCB-NPSS=12 = (RRB-PSS=10) ($\overline{\text{RRB-PG}}$) (RRB-DRS) ($\overline{\text{RSM-HC}}$)

SET RCB-TRIC=7 (RRB-IN=6) ($\overline{\text{RRB-WFT}}$) ($\overline{\text{RRB-RQT}}$) (RTG-Y1)

INHIBIT WRITE DRS

51) SET RCB-NPSS=5 = (RRB-PSS=11) (RRB-ARR) [(RRB-SAT)+(RRB-CRS)]

INHIBIT WRITE ARR (RTG-Y1)

START TIM

52) SET RCB-NPSS=6 = (RRB-PSS=11) (RRB-ARR) ($\overline{\text{RRB-SAT}}$) ($\overline{\text{RRB-CRS}}$)

INHIBIT WRITE ARR (RTG-Y1)

START TIM

53) SET RCB-NPSS=12 = (RRB-PSS-11) ($\overline{\text{RRB-ARR}}$) ($\overline{\text{RRB-IN=8}}$) ($\overline{\text{RRB-IN=9}}$)

START TIM (RTG-Y1)

54) SET RCB-BD1 = (RRB-PSS-11) (RRB-IN=8) (RTG-Y1)

55) SET RCB-RD2 = (RRB-Pss-11) (RRB-IN=9) (RTG-Y1)

56) SET RCB-TRIC=5 = [(EQUAT 54) (EQUAT 55)] [(RTM-FT) (TIM≡MCC-BTHT)
+($\overline{\text{RTM-FT}}$) (TIM≡MCC-BTLT)] ($\overline{\text{RMN-DIS}}$) [($\overline{\text{RRB-WFT}}$)
($\overline{\text{RRB-RQT}}$)]

57) INHIBIT WRITE IN = (RRB-PSS=12) (RCB-TRIC=8) (RTG-Y9) [(RRB-IN=5)+
(RRB-IN=6)]

58) SET RCB-NPSS=13 = (RRB-PSS=12) (RTG-Y1) {[($\overline{\text{RRB-IN=5}}$) ($\overline{\text{RRB-IN=6}}$)

START TIM ($\overline{\text{RRB-IN=7}}$) ($\overline{\text{RRB-IN=10}}$)]+[(RRB-IN=7) (RRB-IN=10)]
[TIM-40MSEC]}

59) SET RCB-TRIC=6 = (RRB-PSS=13) ($\overline{\text{RRB-IN=12}}$) ($\overline{\text{RRB-IN-13}}$) ($\overline{\text{RRB-WFT}}$)
($\overline{\text{RRB-RQT}}$) (RTG-Y1)

60) SET RCB-YCM1 = (RRB-PSS=13) (RRB-CTR) [(RRB-IN=12)+(RRB-IN-13)]
(RTG-Y1)

61) SET RCB-CL = (RRB-PSS=13) [(RRB-IN-12)+(RRB-IN-13)]

INHIBIT SET RCB-TRBC (RTG-Y1)

62) SET RCB-CL = [(RRB-PSS=15)](RTG-Y1)

63) SET RCB-TRBC = (RRB-PSS=14)(RTG-Y1)

PRC Combined Basic Internal Equations

| | | |
|---|---|---|
| START TIME | = | (2)+(4)+(5)+(6)+7)+(10)+(18)+(29)*+(31)+(34)* +(35)+(38)+(41)+(42)+(46)+(47)+(51)+(52)+(53) +(58)(37) |
| WRITE CSS = 1 | = | (10) |
| ADD ONE TO CSS | = | (12) |
| INHIBIT WRITE CSS | = | (18) |
| WRITE PG | = | (14) |
| INHIBIT PG | = | (11)+(20)+(43) |
| WRITE DRS | = | (RCB-DRSC)*+(43) |
| INHIBIT WRITE DRS | = | (21)+(46)+(48)+(49)+(50) |
| WRITE HC | = | (11)+(22)+(45) |
| WRITE PC | = | (11)+(22)+(45) |
| WRITE RQT | = | (29)* |
| INHIBIT RQT | = | (34)* |
| WRITE WFT | = | (34)* |
| INHIBIT WRITE WFT | = | (30) |
| WRITE TAS | = | (11)+(22)+45) |
| INHIBIT WRITE CRS | = | (18) |
| INHIBIT WRITE SAT | = | (18) |
| INHIBIT WRITE ARR | = | (38)+(48)+(51)+(52) |
| WRITE FD | = | RCB-FDC* |
| INHIBIT WRITE EOP | = | RCB-FDC* |
| INHIBIT WRITE IN | = | (57)* |
| WRITE RSF | = | (RCB-RSFC)* |
| SET RCB-NPSS=1 | = | (2) |
| 2 | = | (4) |
| 3 | = | (21) |
| 4 | = | (25) |
| 5 | = | (6)+(23)+(38)+(51) |

6 = (7)+(24)+(27)+(52)+(48)

10 = (37)+(41)

11 = (49)+(47)

12 = (42)+(46)+(50)+53)

13 = (58)

SET RCB-HRJ = $(2)+(\overline{\mathrm{RB\text{-}PSS=0}})(\mathrm{RB\text{-}PSS}<13)$

SET RCB-TRBC = (3)+(8)+(11)+(19)+(22)+(32)+(36)+(45)+(RRB-TRB) +(63)

SET RCB-BY = (13)*

RESET RCB-BY) = (11)+(18)+(RMU-RESET-BY)

SET RCB-PB = (16)*

SET RCB-OPC = (17)*

SET RCB-TRR = (33)

SET RCB-BD1 = (59)

SET RCB-RD2 = (55)

SET RCB-YCM1 = (60)

SET RCB-CL = (1)+(61)+(62)

SET RCB-TRIC=4 = (27)

5 = (56)

6 = (59)

7 = (48)+(49)+(50)

RPC OUTPUT EQUATIONS - TO RWT

ROW 1-A1 = $\overline{[\mathrm{(RTG\text{-}Y9)(RCB\text{-}CL)}(\overline{\mathrm{RCB\text{-}YCM1}})]}\ \overline{[57]}\ [\mathrm{RRB\text{-}A1}]$ ROW 1-A2 = $\overline{[\mathrm{(RTG\text{-}Y9)(RCB\text{-}CL)}(\overline{\mathrm{RCB\text{-}YCM1}})]}\ \overline{[57]}\ [\mathrm{RRB\text{-}A2}]$ ROW 1-A3 = $\overline{[\mathrm{(RTG=Y9)(RCB\text{-}CL)}(\overline{\mathrm{RCB\text{-}YCM1}})]}\ \overline{[57]}\ [\mathrm{RRB\text{-}A3}]$ ROW 1-A4 = $\overline{[\mathrm{(RTG\text{-}Y9)(RCB\text{-}CL)}(\overline{\mathrm{RCB\text{-}YCM1}})]}\ \overline{[57]}\ [\mathrm{RRB\text{-}A4}]$ ROW 1-B1 + $\overline{[\mathrm{(RTG\text{-}Y9)(RCB\text{-}CL)}(\overline{\mathrm{RCB\text{-}YCM1}})]}\ \overline{[\mathrm{(RCB\text{-}FDC)(RTG\text{-}Y9)}]}\ [\mathrm{RRB\text{-}B1}]$ ROW 1-B2 = $\overline{[\mathrm{(RTG\text{-}Y9)(RCB\text{-}CL)}(\overline{\mathrm{RCB\text{-}YCM1}})]}\ [\mathrm{(RRB\text{-}B2)+(RCB\text{-}FDC)(RTG\text{-}Y9)}]$ ROW 1-B3 = $\overline{[\mathrm{(RTG\text{-}Y9)(RCB\text{-}CL)}(\overline{\mathrm{RCB\text{-}YCM1}})]}\ \overline{[[38]+[48]+[51]+[52]]}\cdot\overline{[\mathrm{RRB\text{-}B3}]}$ ROW 1-C1 = $\overline{[\mathrm{(RTG\text{-}Y9)(RCB\text{-}CL)}(\overline{\mathrm{RCB\text{-}YCM1}})]}\ [\mathrm{RRB\text{-}C1}]$ ROW 1-C2 = $\overline{[\mathrm{(RTG\text{-}Y9)(RCB\text{-}CL)}(\overline{\mathrm{RCB\text{-}YCM1}})]}\cdot[18]\cdot[\mathrm{RRB\text{-}C2}]$ ROW 1-C3 = $\overline{[\mathrm{(RTG\text{-}Y9)(RCB\text{-}CL)}(\overline{\mathrm{RCB\text{-}YCM1}})]}\cdot\overline{[18]}\cdot[\mathrm{RRB\text{-}C3}]$ $$\text{ROW 1-C4} = \overline{[(RTG\text{-}Y9)(RCB\text{-}CL)(\overline{RCB\text{-}YCM1})]}\,[RRB\text{-}C4]$$

$$\text{ROW 1-D1} = \overline{[(RTG\text{-}Y9)(RCB\text{-}CL)(\overline{RCB\text{-}YCM1})]}\,[RRB\text{-}D1]$$

$$\text{ROW 1-D2} = \overline{[(RTG\text{-}Y9)(RCB\text{-}CL)(\overline{RCB\text{-}YCM1})]}\,[RRB\text{-}D2]$$

$$\text{ROW 1-D3} = \overline{[(RTG\text{-}Y9)(RCB\text{-}CL)(\overline{RCB\text{-}YCM1})]}\,[RRB\text{-}D3]$$

$$\text{ROW 1-D4} = \overline{[(RTG\text{-}Y9)(RCB\text{-}CL)(\overline{RCB\text{-}YCM1})]}\,[RRB\text{-}D4]$$

$$\text{ROW 1-E1} = \overline{[(RTG\text{-}Y9)(RCB\text{-}CL)(\overline{RCB\text{-}YCM1})]}\,[RRB\text{-}E1]$$

$$\text{ROW 1-E2} = \overline{[(RTG\text{-}Y9)(RCB\text{-}CL)(\overline{RCB\text{-}YCM1})]}\,[RRB\text{-}E2]$$

$$\text{ROW 1-E3} = \overline{[(RTG\text{-}Y9)(RCB\text{-}CL)(\overline{RCB\text{-}YCM1})]}\,[RRB\text{-}E3]$$

$$\text{ROW 1-E4} = \overline{[(RTG\text{-}Y9)(RCB\text{-}CL)(\overline{RCB\text{-}YCM1})]}\,[RRB\text{-}E4]$$

$$\text{ROW 1-F1} = \overline{[(RTG\text{-}Y9)(RCB\text{-}CL)(\overline{RCB\text{-}YCM1})]}\,[RRB\text{-}F1]$$

$$\text{ROW 1-F2} = \overline{[(RTG\text{-}Y9)(RCB\text{-}CL)(\overline{RCB\text{-}YCM1})]}\cdot[(RRB\text{-}F2)(RTG\text{-}Y1)+(RCB\text{-}RSFC)(RTG\text{-}Y9)]$$

$$\text{ROW 1-F3} = \overline{[(RTG\text{-}Y9)(RCB\text{-}CL)(\overline{RCB\text{-}YCM1})]}\cdot\Big[[11]+[22]+[45]+(RRB\text{-}F3)\Big]$$

$$\text{ROW 1-F4} = \overline{[(RTG\text{-}Y9)(RCB\text{-}CL)(\overline{RCB\text{-}YCM1})]}\,[(RRB\text{-}F4)+(RCB\text{-}TRBC)]$$

$$\text{ROW 1-G1} = \{[(RRB\text{-}G1)((RCB\text{-}NPSS{=}0)+(RTG\text{-}Y1))]+[RCB\text{-}NPSS\text{-}1)(\overline{RCB\text{-}NPSS{=}0})(RTG\text{-}Y9)]+[WRITE\ PSS{=}15]\}\overline{\{RESET\ PSS\}}$$

$$\text{ROW 1-G2} = \{[(RRB\text{-}G2)((RCB\text{-}NPSS{=}0)+(RTG\text{-}Y1))]+[RCB\text{-}NPSS\text{-}2)(\overline{RCB\text{-}NPSS{=}0})(RTG\text{-}Y9)]+[WRITE\ PSS{=}15]\}\overline{\{RESET\ PSS\}}$$

$$\text{ROW 1-G3} = \{[(RRB\text{-}G3)((RCB\text{-}NPSS{=}0)+(RTG\text{-}Y1))]+[(RCB\text{-}NPSS\text{-}4)(\overline{RCB\text{-}NPSS{=}0})(RTG\text{-}Y9)]+[WRITE\ PSS{=}15]\}\overline{\{RESET\ PSS\}}$$

$$\text{ROW 1-G4} = \{[(RRB\text{-}G4)((RCB\text{-}NPSS{=}0)+RTG\text{-}Y1))]+[(RCB\text{-}NPSS\text{-}8)(\overline{RCB\text{-}NPSS{=}0})(RTG\text{-}Y9)]+[WRITE\ PSS{=}15]\}\overline{\{RESET\ PSS\}}$$

$$(\text{WRITE PSS=15}) = (RRB\text{-}PSS{=}13)(RTG\text{-}Y9)(RCB\text{-}CL)(\overline{RCB\text{-}YCM1})(RRB\text{-}IN{=}13)$$

$$(\text{RESET PSS}) = (RRB\text{-}PSS{=}13)(RTG\text{-}Y9)(RCB\text{-}CL)(\overline{RCB\text{-}YCM1})(RRB\text{-}IN{=}12)$$

$$\text{ROW 1-H3} = \overline{[(RTG\text{-}Y9)(RCB\text{-}CL)(\overline{RCB\text{-}YCM1})]}\,\overline{[30]}\cdot[(RRB\text{-}H3)+[34]]$$

$$\text{ROW 1-H4} = \overline{[(RTG\text{-}Y9)(RCB\text{-}CL)(\overline{RCB\text{-}YCM1})]}\,\overline{[34]}\cdot[(RRB\text{-}H4)+[29]]$$

$$\text{ROW 1-I1} = \overline{[(RTG\text{-}Y9)(RCB\text{-}CL)(\overline{RCB\text{-}YCM1})]}\cdot\Big\{\Big[[11]+[22]+[45]\Big]\cdot[RSM\text{-}PC]+[RRB\text{-}I1]\Big\}$$

$$\text{ROW 1-I2} = \overline{[(RTG\text{-}Y9)(RCB\text{-}CL)(\overline{RCB\text{-}YCM1})]}\cdot\Big\{\Big[[11]+[22]+[45]\Big]\cdot[RSM\text{-}HC]+[RRB\text{-}I2]\Big\}$$

ROW 1-I3 - [(RTG-Y9(RCB-CL)(RCB-YCM1)]·[([21]+[46]+[48]+[49]+[50])]
·[(RB-J3)+[43]+(RCB-DRSC)(RTG-Y9)]

ROW 1-I4 = [(RTG-Y9)(RCB-CL)(RCB-YCM1)]·[([11]+[20]+[43])]
·[(RB-I4)+[14]]

ROW 1-J1 = [(RTG-Y9)(RCB-CL)(RCB-YCM1)]·[18]·{[ADD 1-CSS][RRB-J1]
+[ADD 1-CSS][RRB-J1]}

ROW 1-J2 = [(RTG-Y9)(RCB-CL)(RCB-YCM1)][18]·{[(ADD 1-CSS)(RRB-J1)]
[RRB-J2]+(ADD 1-CSS)(RRB-J1)][RRB-J2]}

ROW 1-J3 = [(RTG-Y9)RCB-CL)(RCB-YCM1)]·[18]·{[ADD 1-CSS)(RRB-J1)
(RRB-J2)][RRB-J3]+[ADD 1-CSS)(RRB-J1)(RRB-J2)][RRB-J3]}

ADD 1-CSS = [102+[12] (RTG-Y1)

ROW 1-K2 = [(RTG-Y9)(RCB-CL)(RCB-YCM1)][START]{(ADD 1-MDA][RRB-K2]
+[ADD 1-MDA][RRB-K2]}

ROW 1-K3 = [RTG-Y9)(RCB-CL)(RCB-YCM1)][START]{[ADD 1-MDA(RRB-K2)]
[RRB-K3]+[ADD 1-MDA)(RRB-K2)][RRB-K3]}

ROW 1-K4 = [(RTG-Y9)(RCB-CL)(RCB-YCM1)][START]{[(ADD1-MDA)(RRB-K2)
(RRB-K3)][RRB-K4]+[ADD 1-MDA)(RRB-K2)(RRB-K3)][RRB-K4]}

ROW 1-L1 = [(RTG-Y9)(RCB-CL)(RCB-YCM1)]{(START)+(ADD 1-TMA][RRB-L1]
+[ADD 1-TMA]·[RRB-L1]}

ROW 1-L2 = [(RTG-Y9)(RCB-CL)(RCB-YCM1)]·[START][ADD 1-MDA)(RRB-K4+
RRB-K2)]·{[ADD 1-TMA)(RRB-L1)][RRB-L2]+[(ADD 1-TMA)
(RRB-L1)][RRB-L2]}

ROW 1-L3 = [(RTG-Y9)(RCB-CL)(RCB-YCM1)]·[START][ADD 1-MDA]·
{[(ADD 1-TMA)(RRB-L1)(RRB-L2)][RRB-L3]+
[ADD 1-TMA)(RRB-L1)(RRB-L2)][RRB-L3]}

ROW 1-L4 = [(RTG-Y9)(RCB-CL)(RCB-YCM1)] · [START] [ADD 1-MDA] ·
{[(ADD 1-TMA)(RRB-L1)(RRB-L3)][RRB-L4] +
[(ADD 1-TMA)(RRB-L1)(RRB-L2)(RRB-L3)] [RRB-L4]}

START = {[2]+[4]+[5]+[6]+[7]+[10]+[18]+[31]+38]+[41]+[42]+[46]+
[47]+[51]+[5]+[53]+[58]+37]+[29]+[34]}

ADD 1-TMA = (RTG-Y1)($\overline{\text{RB-TMA=15}}$)[($\overline{\text{RRB-K4}}$)($\overline{\text{RRB-K3}}$)+($\overline{\text{RRB-K4}}$)
(RTG-ITT)+(RTG-LTT)]

ADD 1-MDA = (RTG-Y1(RB-TMA-15)[($\overline{\text{RRB-K4}}$)($\overline{\text{RRB-K3}}$)($\overline{\text{RRB-K2}}$)+($\overline{\text{RRB-K4}}$)
(RTG-ITT)(RRB-K2·RRB-K3+RRB-K2·RRB-K3)+(RTG-LTT)]

RPC OUTPUT EQUATIONS - TO RCB

RPC-SET-HRJ = [2]+[($\overline{\text{RRB-PSS=0}}$)($\overline{\text{RRB-PSS-13}}$)($\overline{\text{RRB-PSS=14}}$)
(RRB-PSS=15)RTG-Y1)]

RPC-SET-OPC = [17]

RPC-SET-PB = [16]

RPC-EQUAT 54 (TO SET RCB-BD1)

RPC EQUAT 55 (TO SET RCB-RD2)

RPC-SET-JC1 = [54](RRB-IRJ)(TIM A<50MS)

RPC-SET-NPSS-1 = [2]+[6]+[21]+[23]+[38]+[47]+[49]+[51]+[58]

RPC-SET-NPSS-2 = [4]+[7]+[21]+[24]+[27]+[37]+[41]+[47]+[49]+[52]
+[48]

RPC-SET-NPSS-4 = [6]+[7]+[23]+[24]+[25]+[27]+[38]+[42]+[46]+[48]
+[50]+[51]+[52]+[53]+[58]

RPC-SET-NPSS-8 = [37]+[41]+[42]+[46]+[47]+[49][50]+[53]+[58]

RPC-SET-YCM1 = [60]

RPC-SET-TRBC = [3]+[8]+[11]+[19]+[22]+[32]+[36]+[45]+[63]

RPC-SET-TRR = [33]

RPC-SET-TRIC-1 = [48]+[49]+[50]+[56]

RPC-SET-TRIC-2 = [48]+[49]+[50]+[59]

RPC-SET-TRIC-4 = [48]+[49]+[50]+[56]+[59]+[27]

RPC-SET-CL = [1]+[61]+[62]

RPC-SET-BY = [13]

RPC-RESET-BY = [11]+[18]+[RMU-RESET-BY]

RPC-EQUAT-38 = (TO INHIBIT SET RCB-TR)

RPC-EQUAT-61 = (TO INHIBIT SET RCB-TRBC)

SENDER-RECEIVER ASSIGNMENT CONTROL

Figure 5:
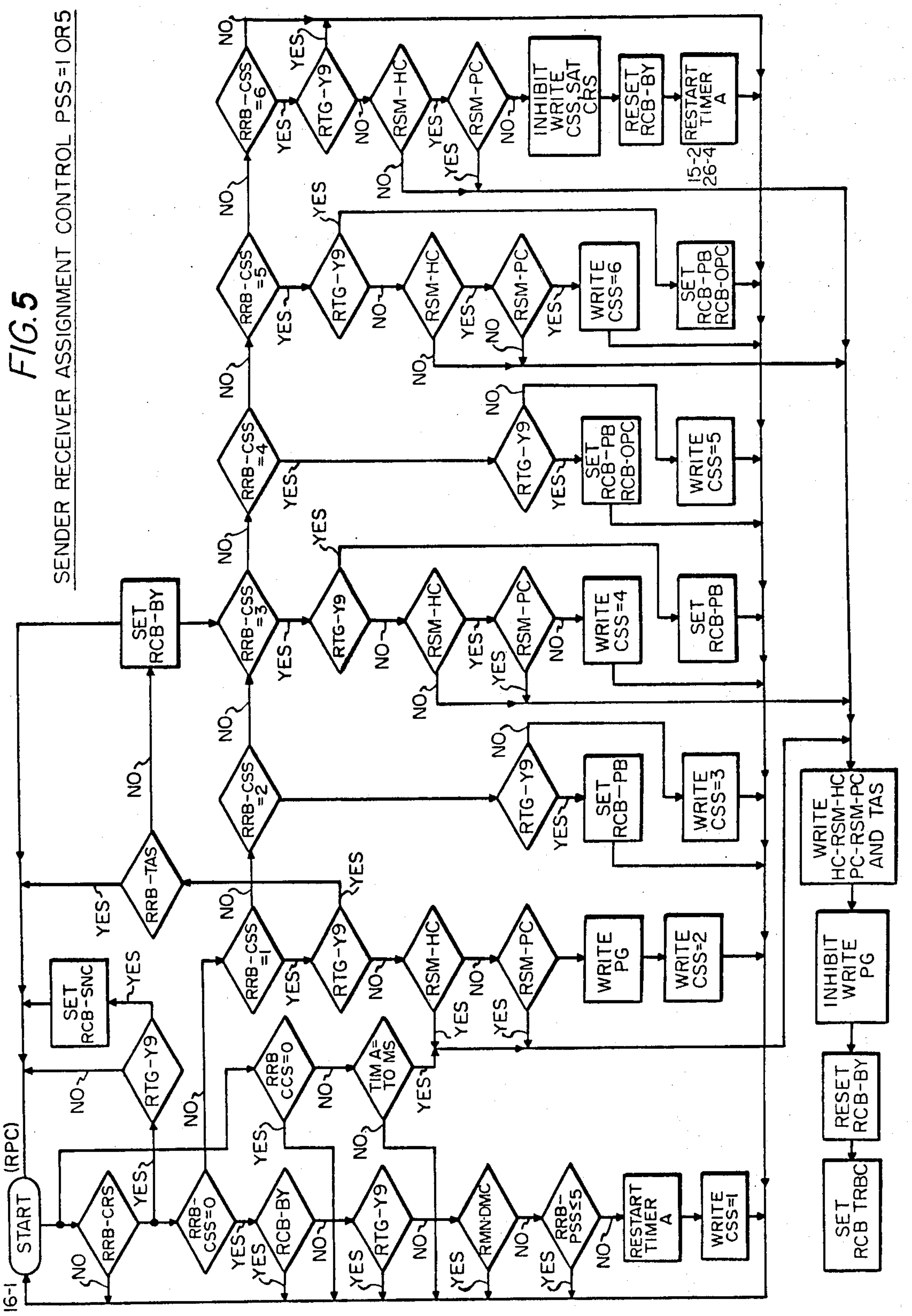
FIG. 5 is a hardware flowchart showing operation of the register-sender subsystem for sender or receiver assignment control.

The flow chart FIG. 5 is the assignment control for connecting either a receiver or sender. The sequence state counter CSS (connection sequent state, bits J1, J2, J3 of word 1B) is controlled by the successful completion of various conditions.

Although each register memory block has its own CSS counter, only one path may be established through the matrix RSX at any given time. xo insure against two or more registers attempting to establish a path simultaneously, in the carry buffer there is a BY latch, for a busy indication. This latch is not reset at the end of a time slot as the other latches, but remains set through the time slots of all of the registers. Once the connection is held and no longer pulling, another connection may be made and the latch BY is reset. Once the connection sequence is started a time of 70 milliseconds is allowed to complete and hold the connection. Initially after CRS becomes true (set by the data processor along with AOG and SRA when an idle unit is found), CSS=O, if BY is in the reset condition, then during sub-time slot Y1 (indicated on the flow chart as $\overline{Y9}$), RMN–DMC (disable matrix connection) is not true, and PSS=5, then the RPC equation 10 is used to write CSS =1 and to start timer A.

The writing of the new values of CSS is in accordance with the RPC output equations (section K1*c*) ROW 1–J1, J2 and J3 and the equation add 1–CSS. Note that the new value is written during sub-time slot Y1. After CSS is not 0, it is advanced once each cycle with RPC equation 12.

The RPC equation 11 calls for trouble by setting the carry buffer latch TRBC under various conditions as indicated on the flow chart and in the equation, and writes PC and HC. Note that this equation includes write TAS (trouble in assignment, bit F3 of word 1A).

The assignment sequence state is set to CSS=1 during sub-time slot Y1 and during the same time slot in sub-time slot Y9 the busy latch BY in the carry buffer is set with RPC equation 13.

During the next time slot 10 milliseconds later in sub-time slot Y1 the sequence is still CSS=1. At this time the signals received from the receiver (whose identity is designated by the values of AOG and SRA in bits C4–F1 of word 1A) as received via the multiplex RSM on leads RSM–HC and RSM–PC should both be not true. The RPC equation 14 is now used to write PG (pull ground, bit 14 of word 1B). The sequence advances at the end of sub-time slot Y1 and becomes CSS=2.

During sub-time slot Y9 of the same cycle with CSS=2, RPC equation 16 is used to set the carry buffer latch RCB–PB. The latch PGL in junctor multiplex RSM, and the latch PBL in the multiplex RSM are set and remain set during the entire cycle. So that the main battery switch from leads PBM in the register junctor (FIG. 3) applies negative 50 volts. Note that the carry buffer RCB equation SET–SNC causes latch RCB–SNC to be set in response to the signal condition of CRS true during sub-time slot Y9 of each cycle. Therefore relay SN has also been operated in response to the signal on lead SNCM in the register junctor. Thus the −50 volts extends through make contacts from relay SN and break contacts of relay TR to lead PXR via matrix RSX (FIG. 1) through the pull winding of relay of the selected crosspoint, and then to the selected receiver through break contacts of relay H to ground from the main ground switch controlled by lead PGMR or PGTR from the multiplex.

In the next cycle during sub-time slot Y1 the sequence advances to CSS=3. During sub-time slot Y9 the latch RCB–PB is again set with RPC equation 16.

During sub-time slot Y1 of the next cycle there is a test that signal HC is true and PC is not true as a part of RPC equation 11. This verifies that there is battery potential via the hold winding of the matrix relay M and that ground potential still appears on the receiver side of the pull winding. The sequence advances to CSS=4.

During sub-time slot Y9 of the same cycle latch RCB–PB is again set, the RPC equation 17 sets the carry buffer latch RCB–OPC.

During the next cycle in sub-time slot Y1 the sequence advances to CSS=5, and during sub-time slot Y9 the latches RCB–PB and RCB–OPC are again set. With the latch RcB –OP set the relay OP in the register junctor is operated which connects a path via a resistor across the RT and TT leads which are connected via contacts of relay SN to leads RX and TX extending to the matrix. This causes the relay A of the receiver to operate. With relay A operated its contacts complete a hold path via break contacts and winding of relay H to the hold winding of the matrix crosspoint relay. This will cause the hold relay to operate since the matrix relay has been previously pulled to complete the path via its own contacts to −50 volt source. Contacts of relay H then disconnect relay A, opens the path from the ground switch to the pull lead, and connects a path from the relay driver to a resistor which is in series with the winding of the H relay.

In the next cycle with CSS=5, in sub-time slot Y1 there is a test made that both the signals HC and PC are true, since there should now be battery potential on both of these leads. If so, the sequence advances to CSS=6. During sub-time slot Y9 of this cycle no action occurs. In the next cycle with CSS=6 there is a check made that the signal on lead HC is true and PC is not true. Note in RPC equation 16 that with CSS=6 the latch RCB–PB is no longer set, so there is no battery potential applied via the pull path to be detected on lead PCTR. Thus in the next cycle with CSS=6, the test is for HC true and PC not true. The RPC equation 18 then inhibits writing in the CSS field, inhibits writing of SAT, inhibits writing of CRS, restarts the timer A and resets the carry buffer latch BY. This completes the sender or receiver assignment operation.

DATA PROCESSING UNIT — ASSIGNMENT OF SENDERS AND RECEIVERS

There are three conditions for selection of a sender or receiver for attachment to a Register Junctor as follows:

1. The sender or receiver must be idle.
2. The sender or receiver is not out of service (off-line) or in a testing mode.
3. The sender or receiver must be accessible (assigned) to the Register Junctor involved in the call.

The third condition is required since all Register Junctors do not have access to all senders and receivers. This is because of traffic engineering economics.

The software uses 12 major tables to reflect the conditions described above, one table for each condition for each type of sender or receiver (two types of receivers and one type of sender). These tables are as follows:

CBT — Busy/Idle Table for TCMF Receivers
CBR — Busy/Idle Table for MF receivers
CBS — Busy/Idle for MF Senders
CMT — On-Line/Off-Line Table for TCMF Receivers
CMR — On-Line/Off-Line Table for MF Receivers
CMS — On-Line/Off-Line Table for MF Senders
CTZ — Assignment (Accessibility) Table for TCMF Receivers — RS Section $\theta$
CRZ — Assignment (Accessibility) Table for MF Receivers — RS Section $\theta$
CSZ — Assignment (Accessibility) Table for MF Senders — RS Section $\theta$ Tables CTO, CRO, and CSO are similar to the three tables above except that they are for Register Sender Section 1. See the layouts for the above 12 tables.

The idle/busy and on-line/off-line tables are organized on a one bit per circuit basis to indicate the status. There is one bit in table CBT, CBR, and CBS TO THE 120 TCMF receivers, 36 MF receivers, and 36 MF senders respectively. The same is true for the on-line/off-line tables. For the assignment tables (tables which indicate accessibility), there are 120 bits in table CTZ, 36 bits in table CRZ, and 36 bits in table CSZ for each Register Junctor group to indicate which of these circuits is accessible by the Register Junctor in the group (group = 8 Register Junctors). For 192 register junctors, there are 24 groups and 24 entries in each table.

The software which performs the selection function is included in the sender/receiver assigner program (C27). Based on the type of sender or receiver required, C27 will perform a logical "and" function of the three tables on a bit by bit basis until all three conditions are met, i.e., idle, in service, and accessible to the Register Junctor. There is a direct relationship between the word and bit positions in the table and the address of the sender or receiver which the Register Sender uses to make the connection. Once an idle receiver or sender is selected, it is set busy in one of the idle/busy tables (CBR, CBS, or CBT). If the selection process is successful, an attempt will be made to try again after a short time delay. This time delay is provided by the software timer queue feature of the Operating System. Additional attempts will not be made if the number of register junctors already waiting for senders or receivers is too large. This is accomplished by comparing the number of register junctors waiting for senders or receivers with an engineered parameter in table CCW. If the value is exceeded, an additional attempt will not be made and the call will be locked out.

A unique aspect of the selection process is the method of providing a random selection. When C27 starts its scan of the tables to find a sender or receiver, it will start at the address plus one of the units selected in the previous scan. This address is obtained from CBR for MF receivers, CBS for MF senders and CMR for TCMF receivers. C27 will continue the scan until an idle, one-line, assigned circuit is found. If the scan is unsuccessful and the end of the table is reached, the scan of the table will be resumed starting at the beginning of the table to check the status of the senders or receivers before the starting address. If the selection is unsuccessful on the second scan of the table, this means there is no sender or receiver which meets all the selection criteria. The technique of sequential scan starting where the previous scan stopped allows for equal use of all senders and receivers in the office and greatly reduces the possibility of a subscriber getting a faulty sender or receiver on two successive attempts to make a call.

When a selection is successful, the output of the process is a sender/receiver address (SRA). The software uses the F08 module of the Operating System to write the SRA, the type of unit (AOG), and a Register Sender Instruction (RIN) into the Register sender memory to instruct this subsystem to connect the sender or receiver. The AOS field has three vlaues:

AOG = 1 TCMF
AOG = 2 MF Receiver
AOG = 4 MF Sender

After the sender or receiver is connected and used to receive or send the necessary digits, the Register Sender disconnects the sender or receiver from the Register Junctor and informs the DPU via a sense line. The Operating System upon detecting the change in status of the RS sense line schedules C27 to run. When C27 gets control, the busy/idle bit associated with the sender or receiver will be set idle (=1). This completes the basic cycle of selection, connection, and disconnection.

The on-line/off-line tables are maintained by diagnostic programs and by programs which accept TTY messages. The assignment tables are modified whenever senders or receivers are added to the office or when there is a change in the grading of the units across the outlets of the sender/receiver matrix.

Tables CTO, CRO, and CSO are similar to the three tales CTZ, CRZ, and CSZ except they are for Register Sender Section 1.

The program module descriptions below should be read with reference to related modules described in the SYSTEM and EXECUTIVE patent applications. In addition module F01 is the subject of said Puccini et al., patent application on accessing the register-sender memory.

Sender Receiver Assigner Module C27

1. DRAWING — FIGS. 6–6C

2. PURPOSE — The Sender/Receiver (S/R) Assigner program (module C27) is designed to function as a closed subroutine, maintaining the busy/idle status, and monitoring the assigned/unassigned, on-line/off-line status of all senders and receivers. Module C27 provides for the software assigning and/or idling of all required senders and receivers.

3. FUNCTIONS

Module C27 performs the following functions:

a. Returns to the calling program via an error return when the Route Flag (RTF) is invalid (RTF=3 or

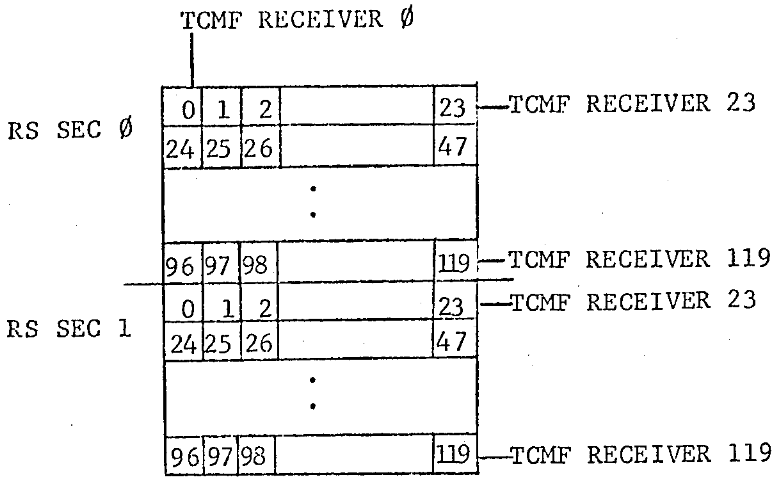

VALUES
Each bit associated with a TCMF Receiver has two values:

1 = Idle
0 = Busy

CBT - BUSY/IDLE TABLE FOR TCMF RECEIVERS

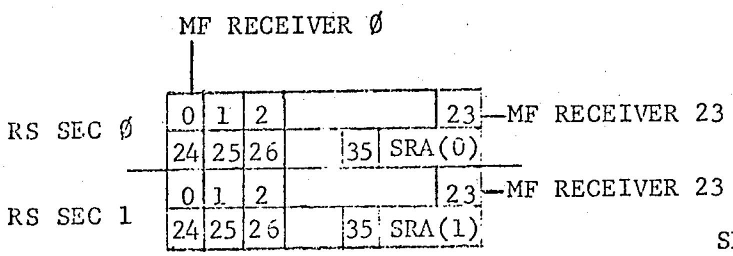

VALUES
Each bit associated with an MF Receiver has two values: 1 = Idle, 0 = Busy SRA(0) - Value of last MF Receiver used for RS Section Ø
SRA(1) - Value of last MF Receiver used for RS Section 1

CBR - BUSY/IDLE TABLE FOR MF RECEIVERS

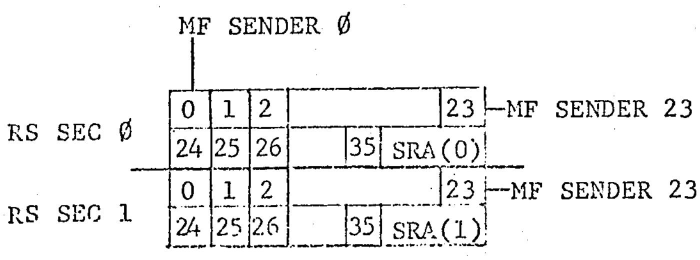

VALUES
Each bit associated with an MF Sender has two values: 1 = Idle, 0 = Busy

SRA(0) - Value of last MF Sender used for RS Section Ø
SRA(1) - Value of last MF Sender used for RS Section 1

CBS - BUSY/IDLE TABLE FOR MF SENDERS

TCMF RECEIVER Ø

| | | | | | | |
|---|---|---|---|---|---|---|
| RS SEC Ø | 0 | 1 | 2 | | 23 | —TCMF RECEIVER 23 |
| | 24 | 25 | 26 | | 47 | |
| | | | ⋮ | | | |
| | 96 | 97 | 98 | | 119 | —TCMF RECEIVER 119 |
| RS SEC 1 | 0 | 1 | 2 | | 23 | —TCMF RECEIVER 23 |
| | 24 | 25 | 26 | | 47 | |
| | | | ⋮ | | | |
| | 96 | 97 | 98 | | 119 | —TCMF RECEIVER 119 |

VALUES
Each bit associated with a TCMF Receiver has two values:

1 = On-Line
0 = Off-Line

CMT - ON-LINE/OFF-LINE TABLE FOR TCMF RECEIVERS

MF RECEIVER Ø

| | | | | | | | |
|---|---|---|---|---|---|---|---|
| RS SEC Ø | 0 | 1 | 2 | | | 23 | —MF RECEIVER 23 |
| | 24 | 25 | 26 | | 35 | SRA(0) | |
| RS SEC 1 | 0 | 1 | 2 | | | 23 | —MF RECEIVER 23 |
| | 24 | 25 | 26 | | 35 | SRA(1) | |

VALUES
Each bit associated with an MF Receiver has two values: 1 = On-Line
0 = Off-Line SRA(0) - Value of last TCMF Receiver used in RS Section Ø

SRA(1) - Value of last TCMF Receiver used in RS Section 1

CMR - ON-LINE/OFF-LINE TABLE FOR MF RECEIVERS

MF SENDER Ø

| | | | | | | | |
|---|---|---|---|---|---|---|---|
| RS SEC Ø | 0 | 1 | 2 | | | 23 | —MF SENDER 23 |
| | 24 | 25 | 26 | | 35 | | |
| RS SEC 1 | 0 | 1 | 2 | | | 23 | —MF SENDER 23 |
| | 24 | 25 | 26 | | 35 | | |

VALUES
Each bit associated with an MF Sender has two values:

1 = On-Line
0 = Off-Line

CMS - ON-LINE/OFF-LINE TABLE FOR MF SENDERS

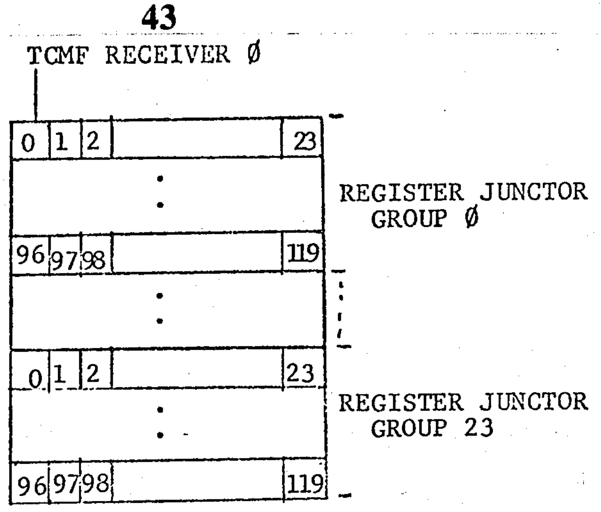

VALUES
Each bit associated with a TCMF Receiver has 2 values:

1 = Assigned
Ø = Not Assigned

CTZ - ASSIGNMENT (ACCESSIBILITY) TABLE FOR TCMF RECEIVERS RS SECTION Ø

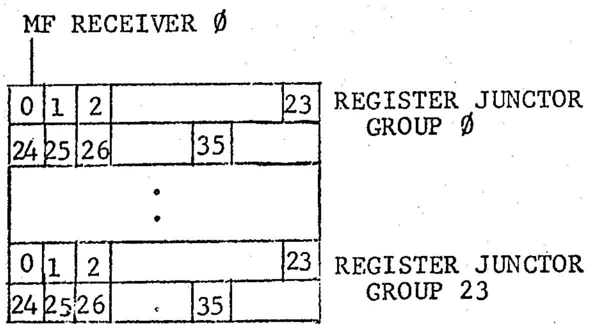

VALUES
Each bit associated with an MF Receiver has 2 values:

1 = Assigned
Ø = Not Assigned

CRZ - ASSIGNMENT (ACCESSIBILITY) TABLE FOR MF RECEIVERS RS SECTION Ø

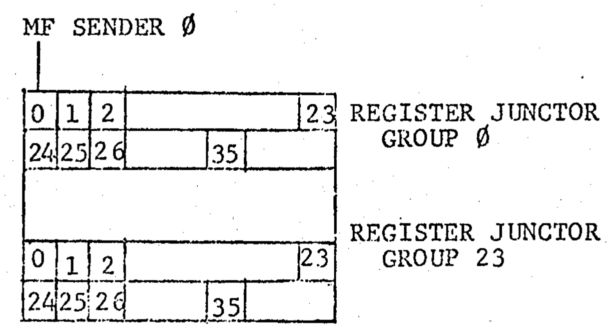

VALUES
Each bit associated with an MF Sender has 2 values:

1 = Assigned
Ø = Not Assigned

CSZ - ASSIGNMENT (ACCESSIBILITY) TABLE FOR MF SENDERS RS SECTION Ø

RTF>5$. An error indicator (RST) is set to zero when an illegal Route Flag is encountered. The S/R Assigner field (RSA) is set to zero indicating that this particular S/R is not assigned to any call.

b. While initiating one attempt in selecting an idle, on-line, and assigned Sender or Receiver:

1. Determines which type of Sender or Receiver is required via the Assigned Matrix Outlet Group (AOG).

AOG=1: Touch Call Multifrequency (TCMF) Receiver.

AOG=2: Multifrequency (MF) Receiver.

AOG=4: Multifrequency (MF) Sender.

2. Sets RST equal TO 2 indicating an invalid AOG, and returns to the calling program via an error return when one of the three types of S/R's cannot be located.

3. Makes one attempt to select an idle, on-line, and assigned Sender or Receiver. When the desired unit is found, it is makred as busy (in the Busy-Idle table) and the unit's address is placed in the SRA field in one of the three core tables depending on the type sender/receiver selected (Table CBR for MR receivers, table CBS for MF senders, table CMR for TCMF receivers) and also in the work area (field FWBSRA). The RSA field is set to one indicating the S/R is assigned to a call. Register A is set positive, and is used as a success indicator in returning control to the calling program.

4. Sets Register A negative (error indication) when the desired unit is not located. Module C27 returns to the calling program with one of the following error trouble indications:

CWARST=0 — RTF is illegal.

CWARST=1 — A11 Assigned S/R's are busy and/or off-line.

CWARST=2 — AOG field is invalid.

c. When RTF equals 2:

1. Makes continuous attempts to select an idle, on-line, and assigned S/R (RTF is internally set to 1).

2. Marks the unit busy in the Busy-Idle tables and places its address in the SRA field in one of three core tables depending on the type of S/R selected (table CBR for MF receivers, table CBS for MF senders, table CMR for TCMF receivers) and also in the work area (field FWBSRA) when the desired unit is found.

3. Sets Register A positive (success indication), and returns control to the calling program when the S/R is located.

4. Causes a Register Sender (RS) System trouble indication when a timeout occurs and the S/R is not located.

d. Makes continuous attempts to obtain an idle, on-line, and assigned S/R when RTF equals 1. The continuous attempts are performed in association with a S/R Timing mechanism located in RS Memory. A timeout will occur if the desired S/R is not obtained. (RTF is set to 1 on the first timing attempt, when RTF=2).

e. When RTF=4 or 5:

1. Determines if the S/R is assigned and busy. When the S/R is both assigned and busy, and if RTF=4, module C27 marks the S/R as idle (in the S/R tables and in RS Memory). RSA is set to zero indicating that this particular S/R is not assigned and Register A is set positive (success indication) prior to returning to the calling program.

2. Marks the S/R as idle (in the S/R tables without affecting RS Memory (e.g., the S/R is software idled only), when the S/R is both assigned and busy and RTF=5. Processing then continues as in function (e) 1.

3. Marks the S/R as idle and on-line (in the S/R tables) and sets RST to 4 to indicate that the S/R is not assigned to the Register Junctor (RJ) when the S/R is found to be unassigned. RSA is set to zero indicating the S/R is not assigned to any call. Register A is set negative as an error indication prior to returning to the calling program.

4. Sets RSA to 3 indicating the S/R is already in the idle state, when S/R is found to be idle. RSA is set to zero and the A Register is set negative prior to returning control to the calling program.

4. INPUTS 4.1 SOFTWARE 4.1.1 Core Tables

CBR — Busy Idle Table for Multifrequency Receivers.

CBS — Busy Idle Table Multifrequency Senders.

CBT — Busy Idle Table For Touch Call Multifrequency Receivers.

CCW — Call Processing Counts of Work Areas on the Timer Queue for Sender/Receiver Timing.

CEP — Engineered Office Parameters.

CHQ — Program Generated Indicators.

CMR — On-/Off-line Multifrequency Receivers.

CMS — On-/Off-Line Multifrequency Senders.

CMT — On-/-Off-line Touch Call Multifrequency Receivers.

CTP — Pointers to Sender/Receiver Assignment Table.

CWA — Drum Table CDN.

FWA— Executive Interface Work Area.

FWB — Call Processing Register Sender Memory Image.

4.1.4 Drum Tables — None.

4.1.3 Registers — None.

4.2 HARDWARE — None.

5. OUTPUTS 5.1 SOFTWARE 5.1.1 Core Tables

CBR — Busy Idle Table for Multifrequency Receivers.

CBS — Busy Idle Table for Multifrequency Senders.

CCW — Call Processing Counts of Work Areas on the Timer Queue for Sender/Receiver Timing.

CMR — On-Line/Off-Line Table for Multifrequency Receivers.

CHQ — Program Generated Indicators.

CWA — Drum Table CDN.

FWA — Executive Interface Work Area.

FWB — Call Processing Register/Sender Memory Image.

5.1.2 Drum Tables — None.

5.1.3 Registers — None.

5.2 HARDWARE — None.

6. CONTROL 6.1 ENTRY POINTS

| Entry Points | Reasons for Entry |
|---|---|
| E02X02 | Internal Timer Request Acceptor program; E02X02 is used to cause requests for timing of specific time intervals to be added to the Executive's timer queue. |

6.2 EXIT POINTS

Exit Points — Reasons for Exit

C26X04 — Final Processor Module: C26X04 is used to provide lockout to those calls requesting a continuous attempt at finding an idle, on-line, and assigned sender/receiver when the call is not allowed to be placed on the exec timer queue.

7. SUBROUTINES USED

Entry Points — Functional Names

C29X01 — Call Condition Analysis.

F08X01 — Register Sender Write.

8. NARRATIVE 8.1 DISSCUSSION

Module C27 is used by various programs with in the EAX system for two basic purposes: (1) software assignment and/or idling of all senders and receivers; (2) for maintenance of the software sender and receiver busy/idler status table.

An access to module C27 is initiated when Call Processing requires the call be assigned a sender or receiver. Module C27 initates a single attempt in obtaining a receiver. If this attempt fails, module C27 is instructed to continue making attempts to obtain a receiver until either one is found or a timeout occurs.

Module C27 may also be called to idle a given sender or receiver. The sender or receiver is marked as idle (in the S/R status tables) and the RS Memory is modified unless the calling program requested only software idling (RTF=5). For this situation, modification of the RS memory is by-passed.

8.2 — TECHNIQUE

Module C27 employs a technique in the assignment of idle, on-line, and assigned receivers to call originations in the Originating Class Of Service Analysis program (module C02). When an origination occurs which requires the assignment of a receiver, module C02 calls module C27 (RTF=0). Module C27 then initiates a single attempt in obtaining the required receiver. If this attempt fails, module C27 returns control to module C02 with an appropriate error indication.

Module C02 initiates a S/R timing mechanism in RS memory and instructs module C27 to begin a continuous search for an idle, on-line, and assigned receiver (RTF=2). The search continues until either a receiver is obtained or the timer runs out, causing a RS System troble indication. Utilizing this technique, the subscriber is afforded the best possible chance in obtaining the required receiver.

Before initiating this S/R timing mechanism, however, C27 will determine if the work area associated with the call is allowed to be plaCed on the exec timer queue for S/R timing. When RTF=2, C27 will determine the type of work area associated with the call. Then, depending on the type of work area, C27 will check a counter (CCWS26 or CCWS38) to determine how many work areas of that type are currently on the timer queue for S/R timing. C27 will then compare this counter with a parameter in table CEP which specifies the maximum number of work areas of that type allowed to be placed on the exec timer queue. If the counter is less than the parameter value, the work area will be allowed to be placed on the timer queue. If the counter is greater than or equal to the parameter value, the work area will be not be allowed to be placed on the timer queue and C27 will send the call to lockout.

For those calls allowed to be placed on the time queue, before placing the work area on the timer queue, C27 will increment the appropriate counter indicating how many work areas of that type are on the timer queue for S/R timing.

For calls coming off the timer queue, C27 will determine the type of work area associated with the call and then decrement the appropriate counter indicating how many work areas of that type are on the timer queue for S/R timing.

Another technique employed by C27 is the particular method used in selecting an idle, on-line and assigned sender/ receiver. When called to obtain a sender/-receiver, C27 will determine the particular type of sender/receiver requested. Then depending on the type of sender/receiver requested, C27 will access one of the three core tables (CVR for Mf receivers, CBS for MF senders, CMR for TCMF receivers) to obtain the identity of the last used sender/receiver of the type requested. This identity will be contained in the SRA field of the core table accessed. C27 will then start searching for a sender/receiver of the type requested from the location of the last used sender/receiver plus one. When C27 finds an idle, on-line, and assigned sender/receiver of the type requested, it will place the identity in the SRA field of the appropriate core table as mentioned above (table CBR for MF receivers, table CBS for MF senders, table CMR for TCMF receivers). This technique of sequential searching allows for equal use of all senders/receivers in an office.

Register Sender (RS) Access Module — F08

1. DRAWING — FIG. 7

2. PURPOSE — The RS Access program (module F08) provides Call Processing and Maintenance user the required interface with the RS, thus enabling access of RS Memory. Module F08 provides Call Processing users the capability to either read or read/modify/write RS Memory. For Maintenance users module F08 provides the capability to read, write or read/modify/write RS Memory. The read or write has a maximum of 32 words (two adjacent register junctor slots).

3. FUNCTIONS

Module F08 performs the following functions:

a. Insures that the data processor and the RS do not simultaneously attempt to access the same Register Junctor (RF) Memory slot.

b. Writes information from either work area table FWB into RS Memory, thus protecting those fields requiring protection during the call, or from the RS Memory image into work area table FWB, when the call to module F08 is by the Call Processing.

c. Writes information from either a buffer area (1 to 32 words) into RS Memory (up to 2 adjacent RJ slots) or from RS Memory (up to 2 adjacent RJ slots), when the call to module F08 is by Maintenance. Module F08 may also read words from one RJ slot, modifying items according to values in a buffer area (32 words — 16 data words and 16 mask words), then write the result into RS Memory.

d. Returns to the calling program when module F08 processing on a Call Processing access is successful. If an error is found in RS Memory and RS trouble is not ignored, module F08 returns to the error module.

e. Returns to the calling program when module F08 processing on a Maintenance access is successful. If an error is encountered, Register RA is set negative before returning to the calling program.

f. Releases the Work Area (WA) via the Call Condition Analysis (module C29) entry line C29X03, when the access in module F08 control information indicates the Communications Control Register (CCR) is equal to 1.

4. INPUTS
4.1 SOFTWARE
4.1.1 Core Tables
FNT — Determine Number Time Slot.
FRW — Register Sender Write Control.
FWA — Executive Interface Work Area.
FWB — Call Processing Register Sender Memory Image.
4.1.2 Drum Tables — None.
4.1.3 Registers — None.
4.2 HARDWARE — None.
5. OUTPUTS
5.1 SOFTWARE
5.1.1 Core Tables
FWB — Call Processing Register Sender Memory Image.
5.1.2 Drum Tables — None.
5.1.3 Registers — None.
5.2 HARDWARE — None.
6. CONTROL
6.1 ENTRY POINTS Entry Points — Reasons for Entry

F08X01 — F08X01 is scheduled by Call Processing to perform a read or a read/modify/write of RS Memory.

F08X02 — F08X02 is scheduled by Maintenance to perform a read, write, or read/modify/write of RS memory.

6.2 EXIT POINTS

Exit Points — Reasons for Exit

C29X03 — Call Condition Analysis Program: C29X03 is used when it is desirable to have module C29 release the WA when a RS interrupt does not occur.

7. SUBROUTINES USED

Entry Points — Functional Names

F01X01 — RS Interlock (RSTIME).

F01X02 — RSTIME.

8. NARRATIVE
8.1 DISCUSSION

Module F08 is divided into two separate routines; one for Call Processing users (F08X01), and the other for Maintenance users (F08X02).

Entry line F08X01 provides the user the capability of either a read or a read/modify/write of up to 16 RS Memory words. The following input requirements are imposed on the user:

1. Index register one (X1) must contain the WA address.
2. Index register two (X2) must contain the F08's Access Number.
3. Index register three (X3) must contain the RJ identity. The RJ identity consists of the RJ number (RJN) and the RS Section (SEC) number.

The F08 Access Number, passed by the user in register X2, is utilized by module F08 to index table FRW. Table FRW contains the necessary control bit information to determine which RS memory words are affected by read or read/modify/write parameter. Module F08 also utilizes this control bit information to determine whether a read only or a read/modify/write parameter is involved. (See Table F01-1 for a complete definition of the various module F08 Access Numbers).

Another parameter defined the F08 Access Number is whether or not module F08 is to return to the user or exit, via a WA release, at the conclusion of its processing.

Entry line F08X02 provides the user the capability of either reading or writing up to 32 words (two adjacent RJ slots) of RS Memory. Users may also read-modify-write up to 16 words of RS Memory. The following input requirements are imposed on the user:

1. For a read or write of RS Memory:

a. Registers RA and RQ must have the control bits.

| | | | | | | | | | | | | | | | | | | | | | |
|---|---|---|---|---|---|---|---|---|---|---|---|---|---|---|---|---|---|---|---|---|---|
| RA= | A1A | A1B | A2A | A2B | A3A | A3B | A4A | A4B | A5A | A5B | A6A | A6B | A7A | A7B | A8A | A8B | TOI | OTI | RMW | | NOW | |
| | 23 | | | | | | | | | | | | | | | | | | 05 | 04 | | 00 |
| RQ= | B1A | B1B | B2A | B2B | B3A | B3B | B4A | B4B | B5A | B5B | B6A | B6B | B7A | B7B | B8A | B8B | | 0 | ------ | ------ | ------ | 0 |
| | 23 | | | | | | | | | | | | | | | 08 | 07 | | | | | 00 |

where: A1A, A1B, . . . A8B = 1, indicates which words to read or write in Memory (first slot) or buffer area (Words 1–16). B1A, B1B, . . . B8B = 1, indicates which words to read or write in RS Memory (second slot) or buffer area (words 17–32).

Trouble Override Indicator (TOI).

TOI = 1 — RS access even though RS trouble indicators are set.

TOI = 0 — RS access inhibited when RS trouble indicators are set.

Operation Type Indicator (OTI).

OTI = 1 — Write from buffer area into RS Memory.

OTI = 0 — Read from RS Memory into buffer area.

Number of words (NOW) — NOW minus one to be updated. NOW is utilized in determining the number of time slots passed to RS Interlock (RSTIME) program (module F01).

The range of NOW is from 0 to 31.

Read Modify Write Indicator (RMW).

RWM = 0 — Either a read or write is to be performed.

b. Start address of the buffer area (XR2).

| | |
|---|---|
| 0 | A1A |
| 1 | A1B |
| | . |
| | . |
| | . |
| 15 | A8B |
| | B1A |
| | . |
| | . |
| | . |
| | B8A |

c. Register Junctor Identity (RJI) = XR1 (includes RJ number and RS section).

XR1 = Address of one RJ slot or the first of two adjacent RJ slots (0 through 255).

2. For a read/modify/write of RS Memory.

a. Register A (RA) must have the control bits.

| RA= | A1A | B1B | A2A | A2B | A3A | A3B | A4A | A4B | A5A | A5B | A6A | A6B | A7A | A7B | A8A | A8B | TOI | RMW | NOW | |
|---|---|---|---|---|---|---|---|---|---|---|---|---|---|---|---|---|---|---|---|---|
| | 23 | | | | | | | | | | | | | | | | | 05 | 04 | 00 |

where: A1A, A1B, . . . , A8B = 1, indicates which words to

TOI = Trouble Override Indicator.

TOI = 1 — RS Access occurs even through RS trouble indicators are set.

TOI = 0 — RS access inhibited when RS trouble indicators are set.

NOW — Number of Words — NOW minus one to be updated. NOW is utilized in determining the number of time slots passed to module F01. The range of NOW is from 0 to 31.

RMW — Read Modify Write Indicator.

RMW — 0 — A read/modify/write is to be performed.

b. Start address of the buffer area (XR2). The first 16 words contain masks used to clear out items in each corresponding word of RS Memory. The last 16 words contain the data which is merged into the cleared out portion of each corresponding word of RS Memory.

The mask words contain zeroes in bit positions to be cleared, and one's in the remaining bit positions. The data words contain the data to be merged into the cleared out portion of the word and zeroes in the remaining bit positions.

| | |
|---|---|
| 0 | A1A |
| 1 | A1B |
| | . . . |
| | A8B |
| | A1A |
| | A1B |
| | . . . |
| | A8B |

c. XR1 (includes RJ Number and RS section) = RJ1.

XR1 — Address of one RJ slot or the first of two adjacent RJ slots (0 through 255).

8.2 TECHNIQUE

The RS Memory is divided into a total of 256 slots; 202 are scanned by RS at 10 ms intervals. Of these scanned slots, 192 are assigned to RJ's. Each RJ slot consists of 16 words. As a result, each memory slot is looked at for approximately 50 μs. One interface requirements is that the RS and Data Processing Unit (DPU) cannot simultaneously access the same RJ slot.

For Call Processing users, module F08 is given an Access Number defining what to do to RS Memory (table FRW). Module F08 determines how much time is required for this particular access, utilizing the Normalized Number of Time Slots (NRM) field of table FRW as an index into table FNT. Table FNT contains the actual access time slot count. For Maintenance users, the index into table FNT is determined utilizing the value of NOW in the user supplied RA register.

Access time data is passed to module F01 where checks and comparisons are performed on RS time. Module R01 has two entry lines, F01X01 and F01X02. When the RS access calls for RS trouble to be ignored, entry line F01X02 is used. For all other situations entry line F01X01 is called. During F01X01 processing, module F01 checks the Temporary (TEM) bit (RS fault) and the Trouble (TRB) bit (RS Trouble). If either bit is set, control is returned to the error program. For entry via entry line F01X02, the RS is written even though a RS trouble might exist.

Assuming no trouble is encountered, module F01 determines if sufficient time exists to allow this access. When sufficient time exists, module F01 disables interrupts ensuring that a valid time estimate remains (e.g., how long before the RS attempts to access this RJ). Module F01 returns control to module F08 and the actual modification is initiated. Module F08 enables interrupts, then returns control to the caller.

TABLE F08-1

| ACCESS | CONTROL | | UPDATE | | RS MEMORY TO BE UPDATED | SPECIAL PROCEDURE |
|---|---|---|---|---|---|---|
| VALUE | RET | REL | RS | FWB | | |
| 1 | | X | X | | 1A,2A,4A, 6A, and 6B | Modify Incoming Digit Counter (IDC) |
| 2 | X | | X | | 4A and 6B | Modify IDC; SB, 6A and Row Six Full (RSF) may be modified by internal logic |
| 3 | X | | X | | 3A,4A,-5A,6B,7A, and 7B | Modify IDC; 5B, 6A and RSF may be modified by internal logic. |
| 4 | X | | X | | 4A,6A, and 6B | Modify IDC |
| 5 | X | | X | | 6A and 6B | |
| 6 | X | | X | | 1A,2A, and 4A | |
| 7 | | X | X | | 1A,2A, and 4A | |
| 8 | X | | X | | 1A and 4A | |
| 9 | | X | X | | 1A and 4A | |
| 10 | X | | X | | 1A | |
| 11 | | X | X | | 1A | Modify Early Outpulsing (EOP) and FD |
| 12 | X | | X | | 3A | |
| 13 | X | | X | | 3A,4A, and 6B | Modify IDC; 5B, 6B, and RSF may be modified by internal logic |

TABLE F08-1 – Continued

| ACCESS CONTROL | | UPDATE | | RS MEMORY TO BE UPDATED | SPECIAL PROCEDURE |
|---|---|---|---|---|---|
| VALUE | RET | REL | RS | FWB | | |
| 14 | | X | X | | 1A | |
| 15 | X | | X | | 1A | Modify EOP and FD |
| 16 | X | | X | | 1A and 4A | Modify EOP and RD |
| 17 | X | | X | | 1A and 4A | Ignore RS trouble |
| 18 | | X | X | | 1A,4A, and 6B | Modify IDC; 5B, 6A, and RSF may be modified by internal logic. |
| 19 | X | | X | | 1A,4A, and 6B | Modify IDC; 5B, 6A, and RSF may be modified by internal logic. |
| 20 | | X | X | | 1A | Ignore RS trouble |
| 21 | | X | X | | 1A and 4A | Ignore RS trouble |
| 22 | X | | | X | 1A,2A,-4A,6A and 6B | |
| 23 | | X | X | | 1A,4A,6A, 7 6B | Modify IDC. |

What is claimed is:

1. An arrangement to select and connect call digit signal devices, in a communication switching system having common control apparatus comprising a stored program data processing unit and a separate register subsystem, wherein the register subsystem comprises a plurality of register junctors for connection to communication lines via a switching network, a register memory having a plurality of blocks of storage, each register junctor having associated therewith an individual one of said blocks, common logic circuits, and time division multiplex means providing cyclically recurring time slots, each register junctor having an individual time slot, with junctor multiplex means to effectively couple each register junctor to the common logic circuits means to read information from its block of memory into a read buffer having outputs to the common logic circuits, and means to write from outputs of the common logic circuits and read buffer into its block of memory, all during its time slot; and a plurality of said call digit signal devices, a switching matrix for connecting the call digit signal devices to register junctors, and signal device multiplex means coupling the call digit signal devices to the common logic circuits during register junctor time slots;

herein the data processing system includes a main memory for storing program instruction sequences and data tables and providing work areas, and a computer central processor for executing the program instruction sequences;

data transfer means interconnecting the data processing unit with the register subsystem so that the computer central processor may select an address in the register memory and cause data to be read from or written into that address to or from the computer central processor;

wherein said arrangement includes assignment tables and busy/idle tables in the main memory for indicating the assignment of call digit signal devices for use with register junctors and the busy/idle status of each call digit signal device; selection means including some of the program instruction sequences and the computer central processor operating with the assignment and busy/idle tables and work areas effective during the processing of a call using one register junctor with call data indicating need for a call digit signal device to select an idle one of them, mark it busy in the busy/idle table, to place identifying data for it in a work area along with instruction data, and using said data transfer means to place the identifying data and instruction data into given areas of the block of storage for said one register junctor;

wherein said arrangement further includes means in the register subsystem effective during the time slot of said one register junctor during successive cycles to read said identifying data and instruction data into the read buffer and with logic means in the common logic circuits and other areas of the block of storage for the register junctor to supply signals via the junctor and signal device multiplex means to the one register junctor and selected call digit signal device for operating the switching matrix to establish a connection between the register junctor and call digit signal device.

2. An arrangement as claimed in claim 1, wherein there are a plurality of call digit signal devices, and there are separate busy/idle and assignment tables for each type.

3. An arrangement as claimed in claim 2, wherein said identifying table includes the type and an address designating the individual device of that type.

4. An arrangement as claimed in claim 3, wherein there are a plurality of sections in the register subsystem, which are independent of one another, each section having its own register junctors, register memory, common logic circuits, multiplex means, call signal signal devices, and switching matrix;

and wherein in the main memory there are separate assignment tables for each section and separate entries in the busy/idle tables.

5. An arrangement as claimed in claim 4, wherein the tables include a location with means to store therein the address of the last device selected of each type, and means to scan for an available device on each request starting at the address plus one stored in said location for the type of device required.

6. An arrangement as claimed in claim 5, wherein the devices of each type are graded on said switching matrix for groups of register junctors so that only certain ones of the devices are available to each group; and wherein the assignment tables have storage for each group for all possible addresses of each type of device.

7. An arrangement as claimed in claim 6, wherein the types of call digit signal devices comprise dual tone receivers for use with local lines having key type tone call units, multifrequency receivers for use with incoming trunk lines, and multifrequency senders for use with outgoing trunk lines.

8. An arrangement as claimed in claim 7, wherein the register subsystem includes means to disconnect the call digit signal device after its use is completed, and wherein there is a sense line for the register subsystem to the computer central processor with means to transmit a signal therein indicating the disconnect; and wherein the data processing unit includes means including program instruction sequences to make the device idle in the busy/idle table.

9. An arrangement as claimed in claim 8, wherein the data processing unit includes means responsive to an unsuccessful attempt to find an idle device to try again after a given time delay by an entry in a queue, provided the number of register junctors waiting for assignment of devices does not exceed a given number stored in a data table.

10. An arrangement as claimed in claim 9, wherein the register memory in each block has an area for a connection sequence counter, with associated logic means in the common logic circuits to control the sequence of operations for establishing a connection in the switching matrix.

11. An arrangement as claimed in claim 10, wherein the main memory further includes on-line/off-line tables for the devices of each type, with maintenance means to set the entry for each device to an on-line or off-line value, and wherein said selection means checks that a device has an on-line value in the table before selecting it.

12. An arrangement as claimed in claim 2, wherein the main memory further includes on-line/off-line tables for the devices of each type, with maintenance means to set the entry for each device to an on-line or off-line value, and wherein said selection means checks that a device has an on-line value in the table before selecting it.

13. An arrangement as claimed in claim 12, wherein the devices of each type are graded on said switching matrix for groups of register junctors so that only certain ones of the devices are available to each group; and wherein the assignment tables have storage for each group for all possible addresses of each type of device.

14. An arrangement as claimed in claim 13, wherein said selection means includes means to perform a logical "and" of the values in the busy/idle table, the assignment table for the register junctor group, and the on-line/off-line table.

15. An arrangement as claimed in claim 2, wherein the tables include a location with means to store therein the address of the last device selected of each type, and means to scan for an available device on each request starting at the address plus one stored in said location for the type of device required.

16. An arrangement as claimed in claim 2, wherein the register memory in each block has an area for a connection sequence counter, with associated logic means in the common logic circuits to control the sequence of operations for establishing a connection in the switching matrix.

17. An arrangement as claimed in claim 16, wherein the register subsystem includes means to disconnect the call digit signal device after its use is completed, and wherein there is a sense line from the register subsystem to the computer central processor with means to transmit a signal thereon indicating the disconnect; and wherein the data processing unit includes means including program instruction sequences to mark the device idle in the busy/idle table.

* * * * *

UNITED STATES PATENT OFFICE

CERTIFICATE OF CORRECTION

Patent No. 3819805 Dated June 25, 1974

Inventor(s) Weber et al

It is certified that error appears in the above-identified patent and that said Letters Patent are hereby corrected as shown below:

Column 3, lines 5 and 6, "now U.S. Pat. No. 3,729,715"
should read -- now abandoned --

Column 3, line 13, should read ... C. K. Buedel now
U. S. Pat. No. 3,729,715 for a ... --

Signed and sealed this 8th day of October 1974.

(SEAL)
Attest:

McCOY M. GIBSON JR.
Attesting Officer

C. MARSHALL DANN
Commissioner of Patents